US008024740B2

(12) United States Patent
Kawato

(10) Patent No.: US 8,024,740 B2
(45) Date of Patent: Sep. 20, 2011

(54) ACQUISITION SYSTEM FOR DISTRIBUTED COMPUTING RESOURCES

(75) Inventor: Masahiro Kawato, Tokyo (JP)

(73) Assignee: NEC Corporation, Tokyo (JP)

( * ) Notice: Subject to any disclaimer, the term of this patent is extended or adjusted under 35 U.S.C. 154(b) by 1404 days.

(21) Appl. No.: 11/081,252

(22) Filed: Mar. 16, 2005

(65) Prior Publication Data

US 2005/0228855 A1 Oct. 13, 2005

(30) Foreign Application Priority Data

Mar. 16, 2004 (JP) ................................. 2004-074630

(51) Int. Cl.
*G06F 9/46* (2006.01)
*G06F 15/177* (2006.01)
*G06F 13/00* (2006.01)

(52) U.S. Cl. ............ 718/106; 718/102; 709/220; 713/1; 710/104

(58) Field of Classification Search .................. 718/100, 718/104; 709/200, 220, 221, 225, 226; 713/100
See application file for complete search history.

(56) References Cited

U.S. PATENT DOCUMENTS

| | | | | |
|---|---|---|---|---|
| 5,745,694 | A * | 4/1998 | Egawa et al. ................. | 709/225 |
| 5,848,244 | A * | 12/1998 | Wilson ......................... | 709/221 |
| 6,496,858 | B1 * | 12/2002 | Frailong et al. ............... | 709/221 |
| 6,584,559 | B1 * | 6/2003 | Huh et al. ......................... | 713/2 |
| 6,694,288 | B2 * | 2/2004 | Smocha et al. ............... | 702/186 |
| 6,725,261 | B1 | 4/2004 | Novaes et al. | |
| 6,931,640 | B2 * | 8/2005 | Asano et al. .................. | 718/104 |
| 6,993,581 | B1 * | 1/2006 | Blumenau et al. ............ | 709/225 |
| 7,028,087 | B2 * | 4/2006 | Caveney ....................... | 709/224 |
| 7,152,157 | B2 * | 12/2006 | Murphy et al. ............... | 713/100 |
| 7,177,897 | B2 * | 2/2007 | Manukyan .................... | 709/200 |
| 7,191,329 | B2 * | 3/2007 | Murphy ......................... | 713/100 |
| 7,210,030 | B2 * | 4/2007 | Edrington et al. ................. | 713/1 |

(Continued)

FOREIGN PATENT DOCUMENTS

JP 2002-49601 2/2002

OTHER PUBLICATIONS

Karl Czajkowski, et al.; "A Resource Management Architecture for Metacomputing Systems"; Proc. 4th IPPS/SPDP Workshop on Job Scheduling Strategies for Parallel Processing; 1998; pp. 62-82.

*Primary Examiner* — Emerson Puente
*Assistant Examiner* — Adam Lee
(74) *Attorney, Agent, or Firm* — Dickstein Shapiro LLP

(57) ABSTRACT

In a resource acquisition system, computing resources are located in different domains, and a resource manager is located in each domain. A scheduler receives a resource acquisition request from a client via a network, and determines at least one administrative domain and transmits to the network a verification request specifying a computing resource and an operation. The resource manager is responsive to the verification request for performing reconfiguration of the specified resource according to the specified operation and verifying that the resource is legitimately reconfigurable, and transmitting back to the scheduler a verification report containing the identifier of the reconfigurable resource. The scheduler is responsive to the verification report for transmitting a reconfiguration request to the resource manager to perform reconfiguration on the verified resource. The scheduler and the resource manager may repeatedly exchange verification requests and verification reports for successively reconfiguring each successive resource according to dependent relationships between computing resources.

12 Claims, 19 Drawing Sheets

U.S. PATENT DOCUMENTS

| | | | |
|---|---|---|---|
| 7,212,813 B2 * | 5/2007 | Moy et al. | 455/418 |
| 7,406,691 B2 * | 7/2008 | Fellenstein et al. | 718/104 |
| 2002/0143926 A1 * | 10/2002 | Maltz et al. | 709/224 |
| 2002/0152289 A1 * | 10/2002 | Dube | 709/220 |
| 2003/0037126 A1 * | 2/2003 | Spicer et al. | 709/220 |
| 2003/0037128 A1 * | 2/2003 | Beadles et al. | 709/220 |
| 2003/0037129 A1 * | 2/2003 | Beadles et al. | 709/220 |
| 2003/0051038 A1 * | 3/2003 | Spicer et al. | 709/229 |
| 2003/0055968 A1 * | 3/2003 | Hochmuth et al. | 709/226 |
| 2004/0064563 A1 * | 4/2004 | Kauhanen et al. | 709/227 |
| 2005/0108369 A1 * | 5/2005 | Sather et al. | 709/220 |
| 2005/0228916 A1 * | 10/2005 | Telesco | 710/200 |
| 2006/0031435 A1 * | 2/2006 | Tindal | 709/220 |
| 2006/0174000 A1 * | 8/2006 | Graves | 709/225 |

* cited by examiner

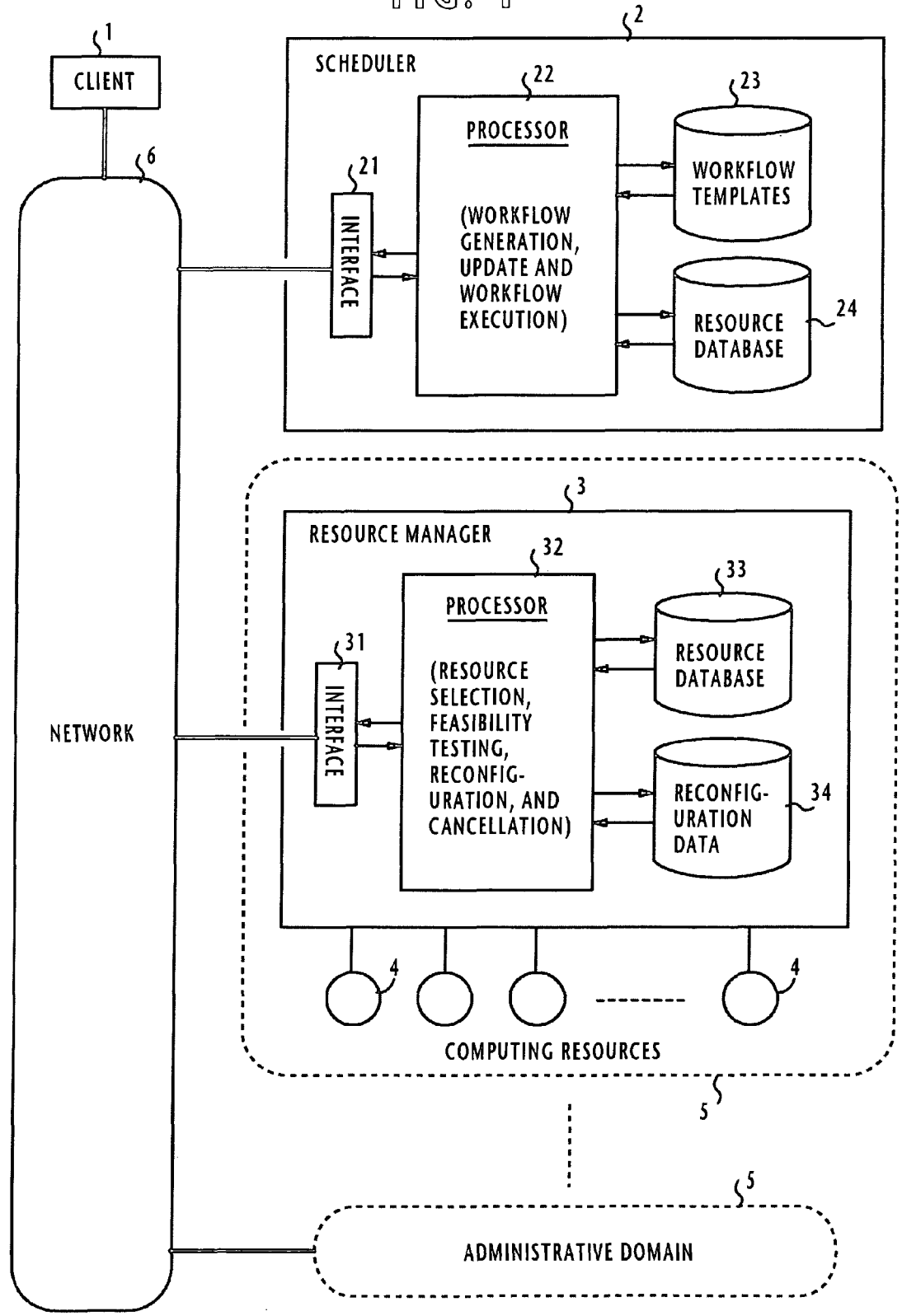

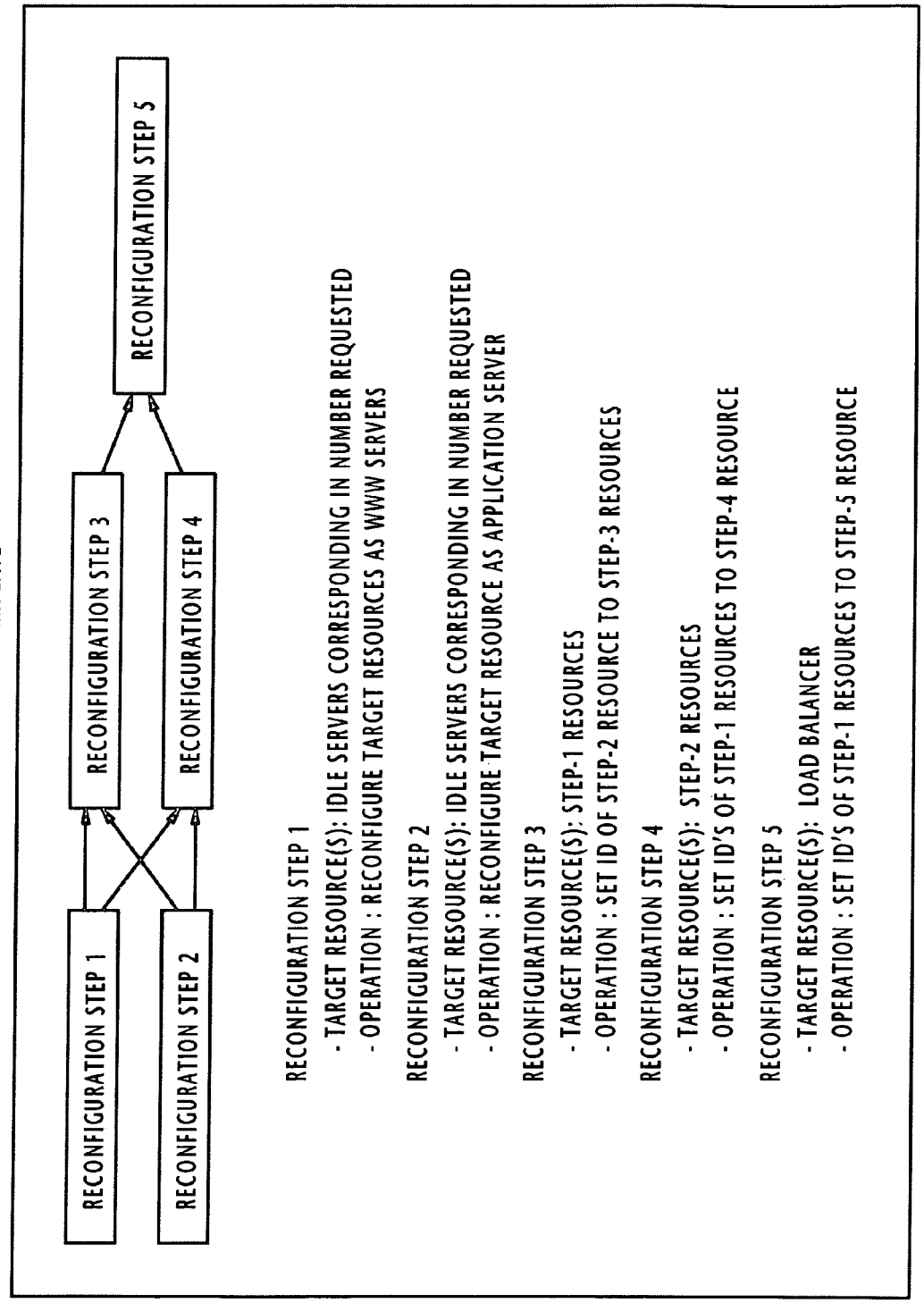

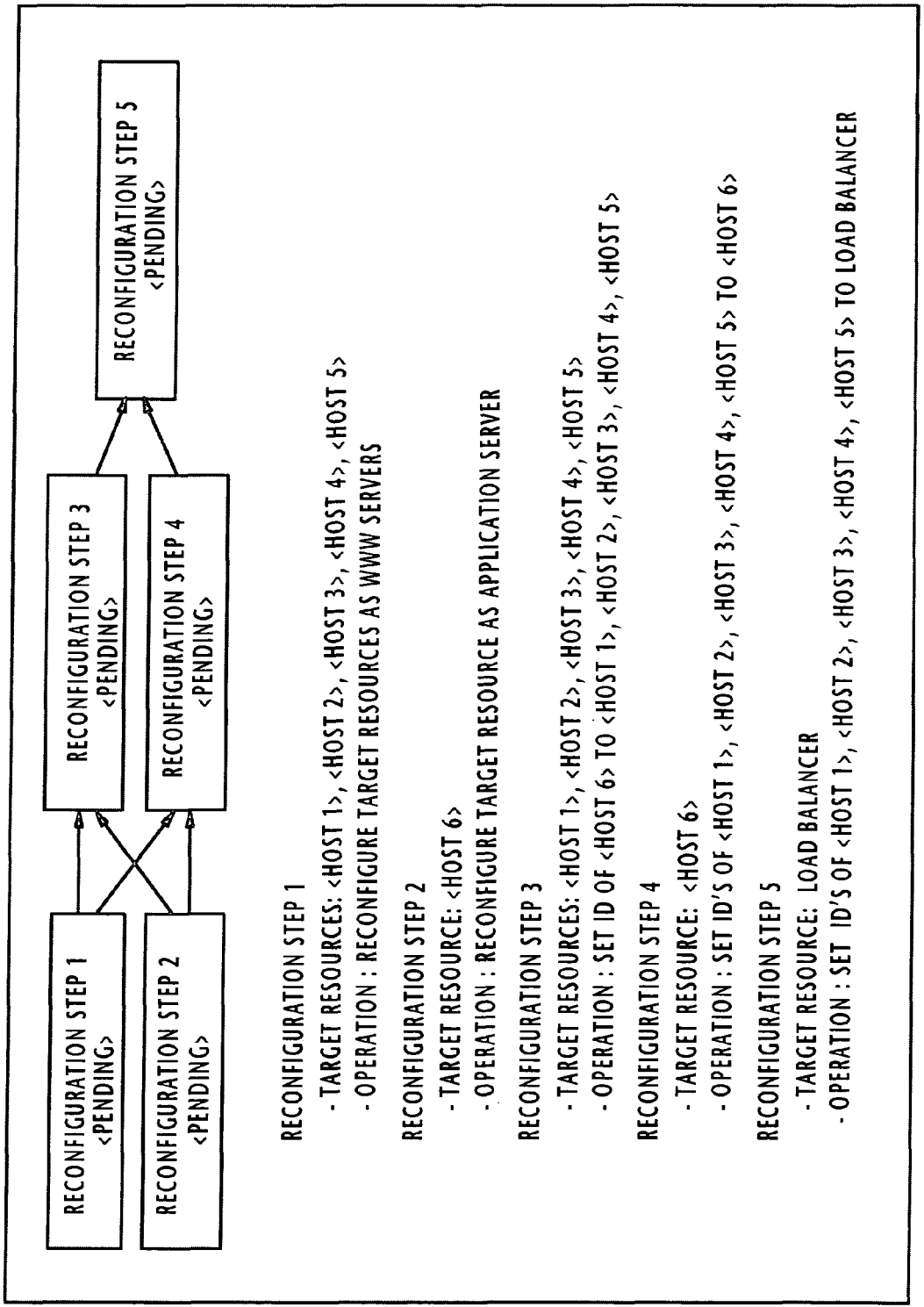

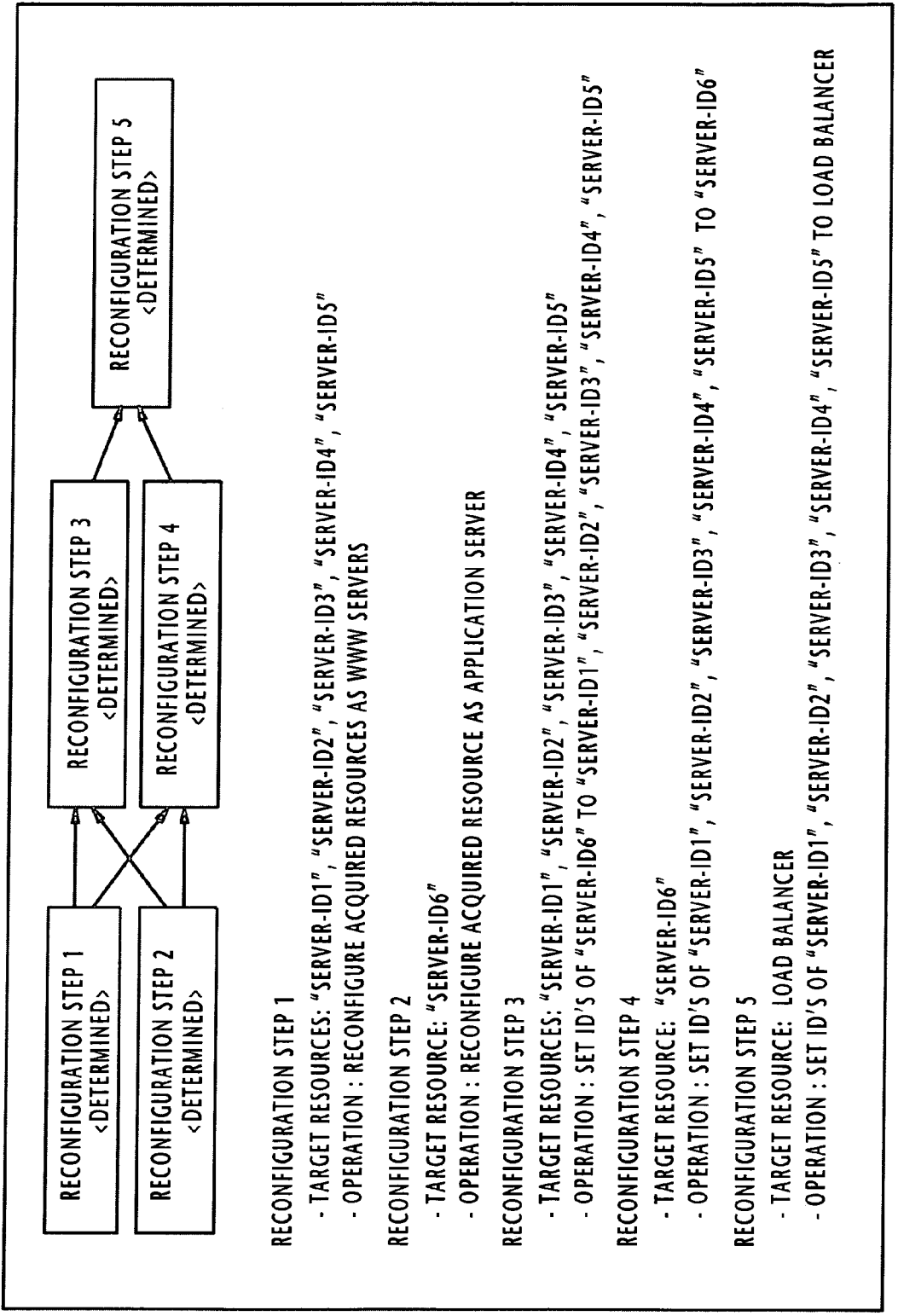

FIG. 3A
INITIAL STATE

| RESOURCE ID | CURRENT STATE | NEW STATE |
|---|---|---|
| SERVER-ID6 | IDLE | NONE |
| SERVER-ID1 | IDLE | NONE |
| SERVER-ID2 | IDLE | NONE |
| SERVER-ID3 | IDLE | NONE |
| SERVER-ID4 | IDLE | NONE |
| SERVER-ID5 | IDLE | NONE |

FIG. 3B
AFTER VERIFICATION

| RESOURCE ID | CURRENT STATE | NEW STATE |
|---|---|---|
| SERVER-ID6 | IDLE | (2) RECONFIGURED AS APPL. SERVER<br>(4) SET IDs OF WWW SERVERS |
| SERVER-ID1 | IDLE | (1) RECONFIGURED AS WWW SERVER<br>(3) SET ID OF APPLICATION SERVER |
| SERVER-ID2 | IDLE | (1) RECONFIGURED AS WWW SERVER<br>(3) SET ID OF APPLICATION SERVER |
| SERVER-ID3 | IDLE | (1) RECONFIGURED AS WWW SERVER<br>(3) SET ID OF APPLICATION SERVER |
| SERVER-ID4 | IDLE | (1) RECONFIGURED AS WWW SERVER<br>(3) SET ID OF APPLICATION SERVER |
| SERVER-ID5 | IDLE | (1) RECONFIGURED AS WWW SERVER<br>(3) SET ID OF APPLICATION SERVER |

FIG. 3C
AFTER RECONFIGURATION

| RESOURCE ID | CURRENT STATE | NEW STATE |
|---|---|---|
| SERVER-ID6 | APPL. SERVER | NONE |
| SERVER-ID1 | WWW SERVER | NONE |
| SERVER-ID2 | WWW SERVER | NONE |
| SERVER-ID3 | WWW SERVER | NONE |
| SERVER-ID4 | WWW SERVER | NONE |
| SERVER-ID5 | WWW SERVER | NONE |

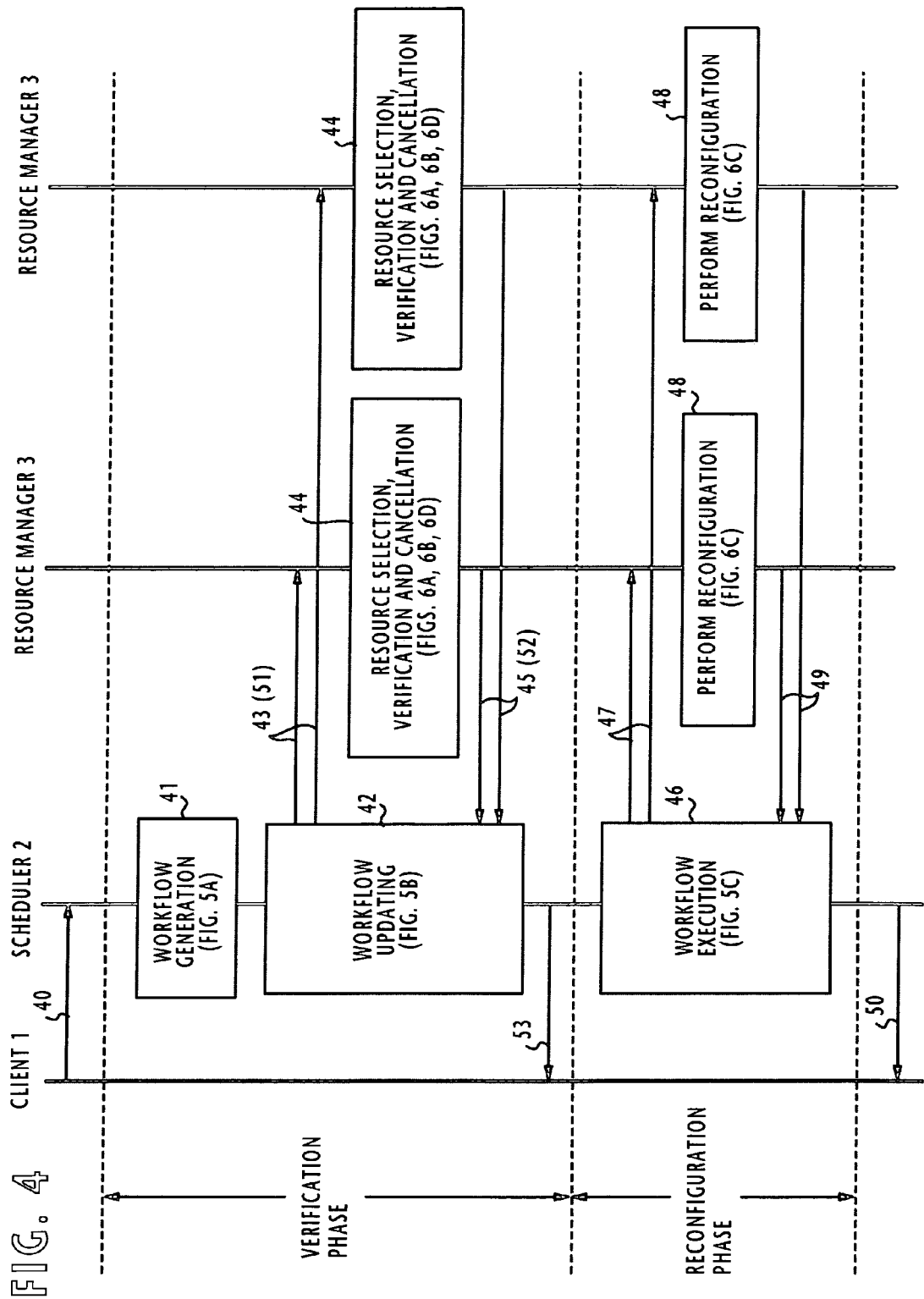

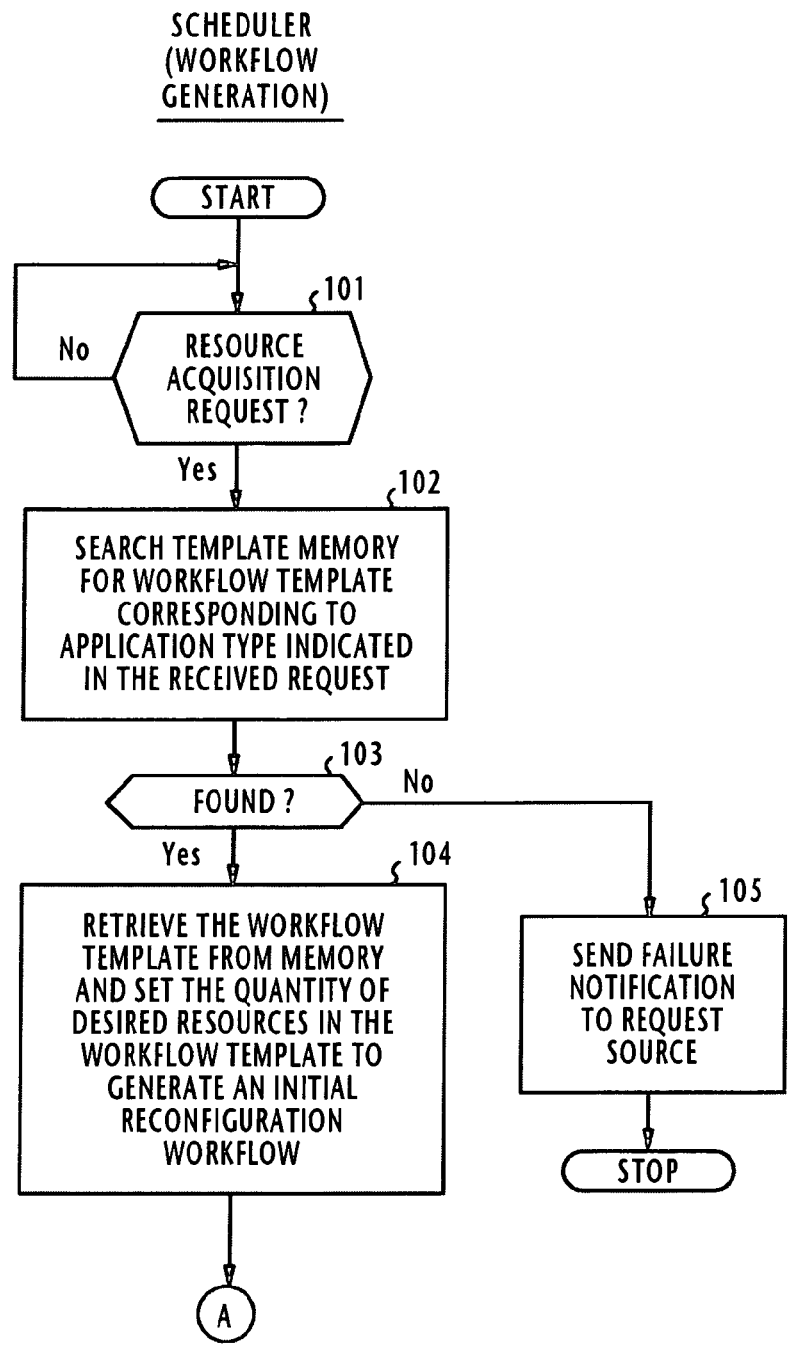

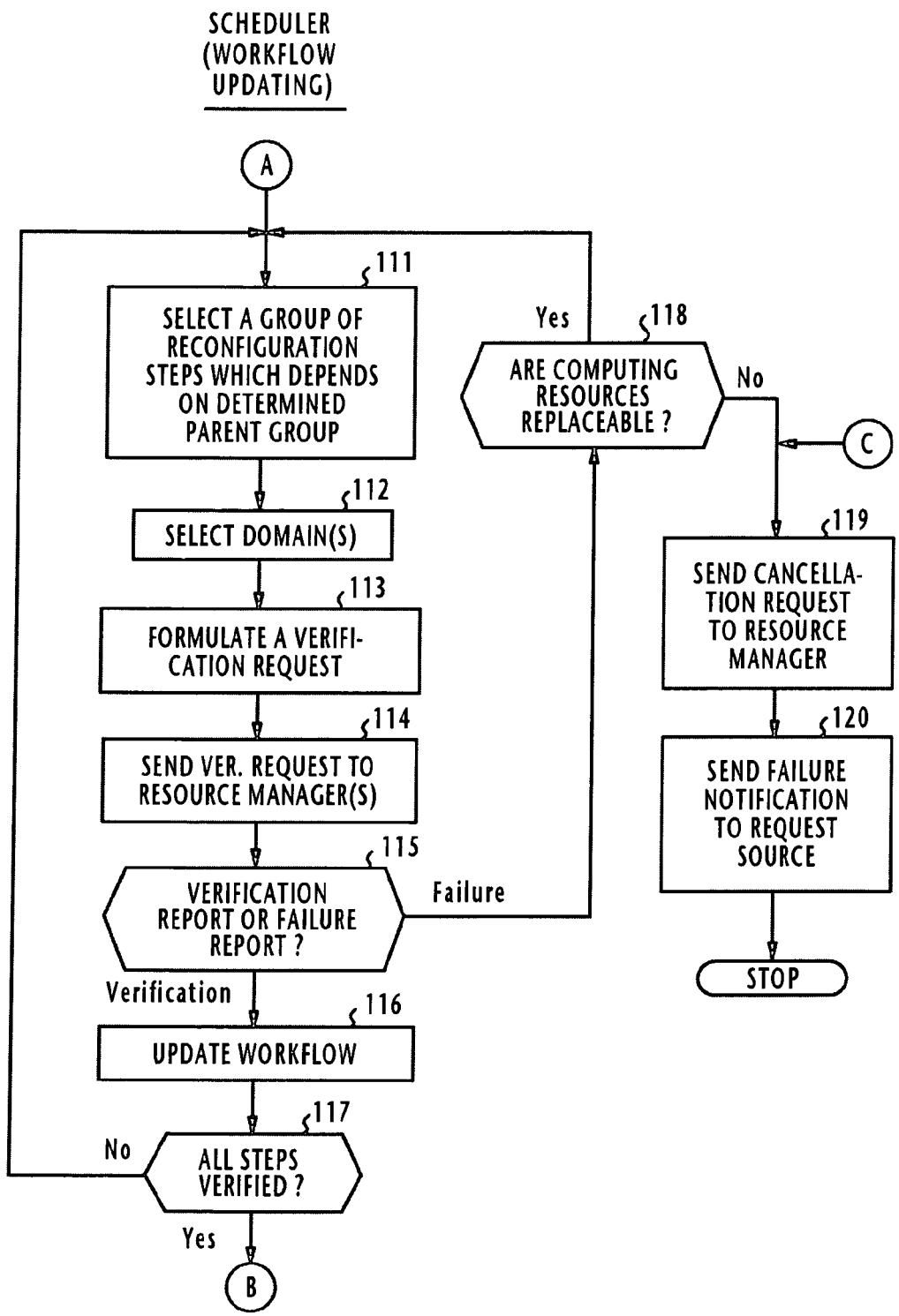

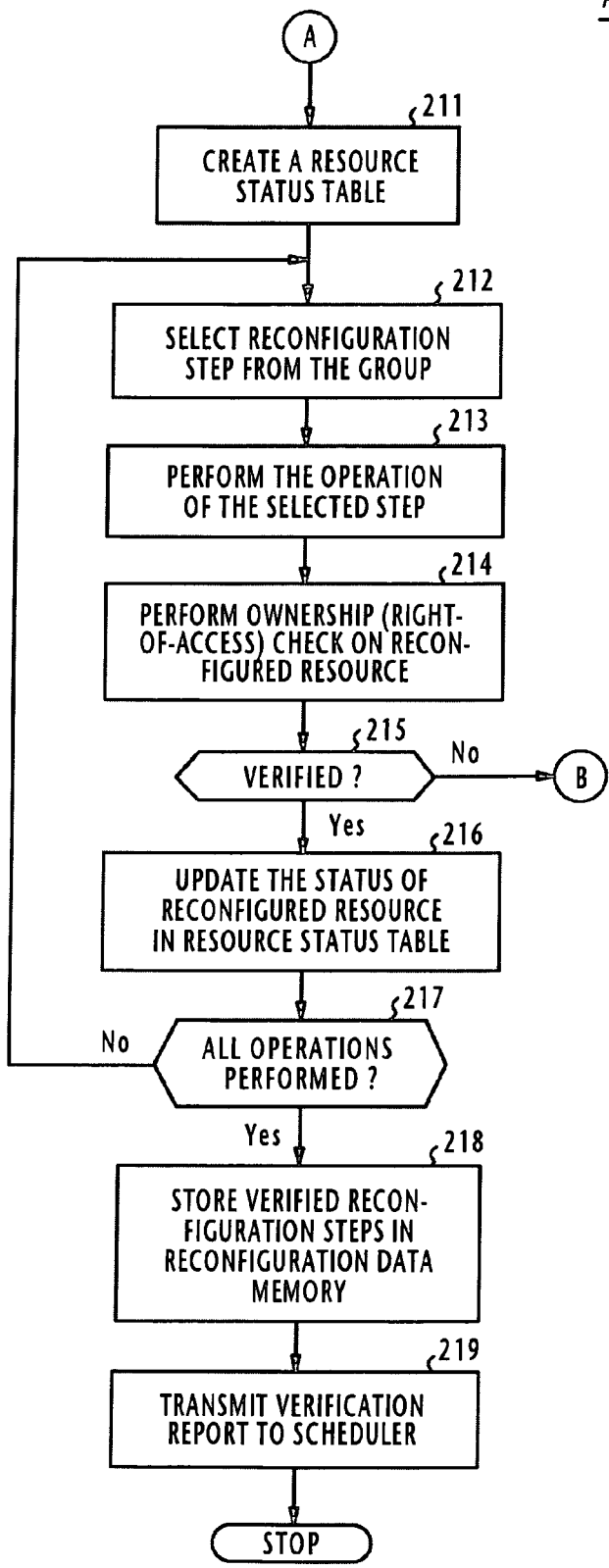

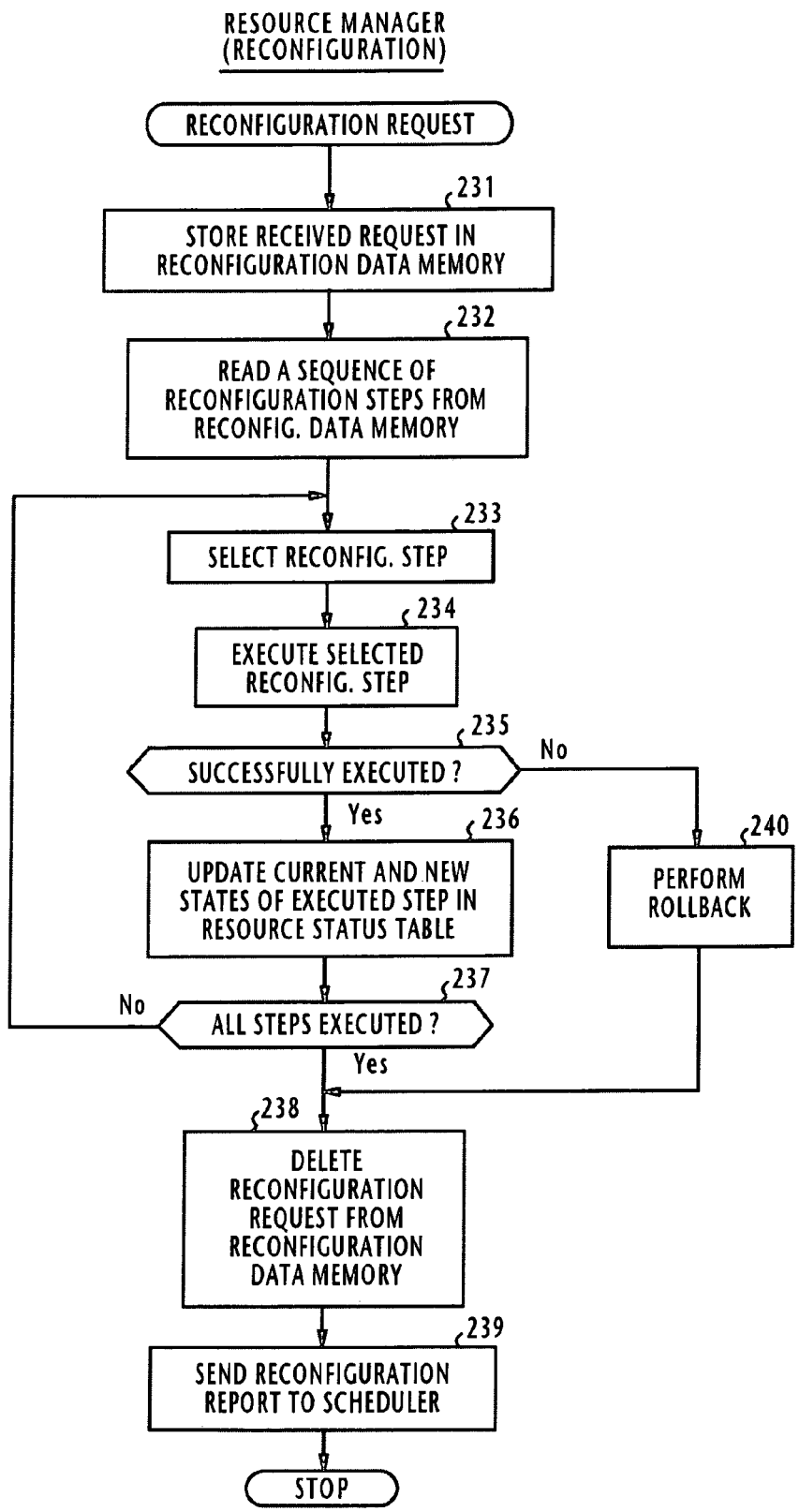

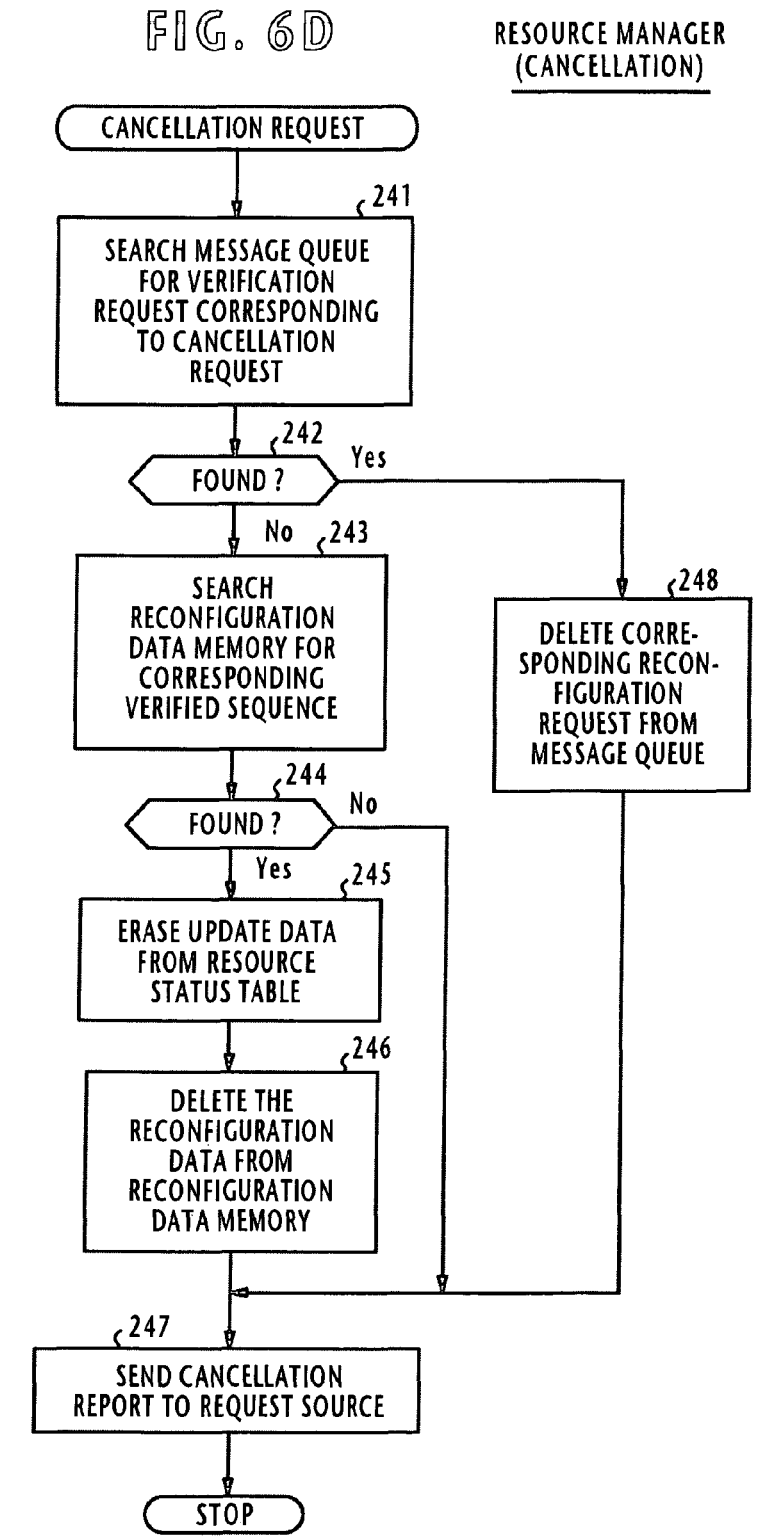

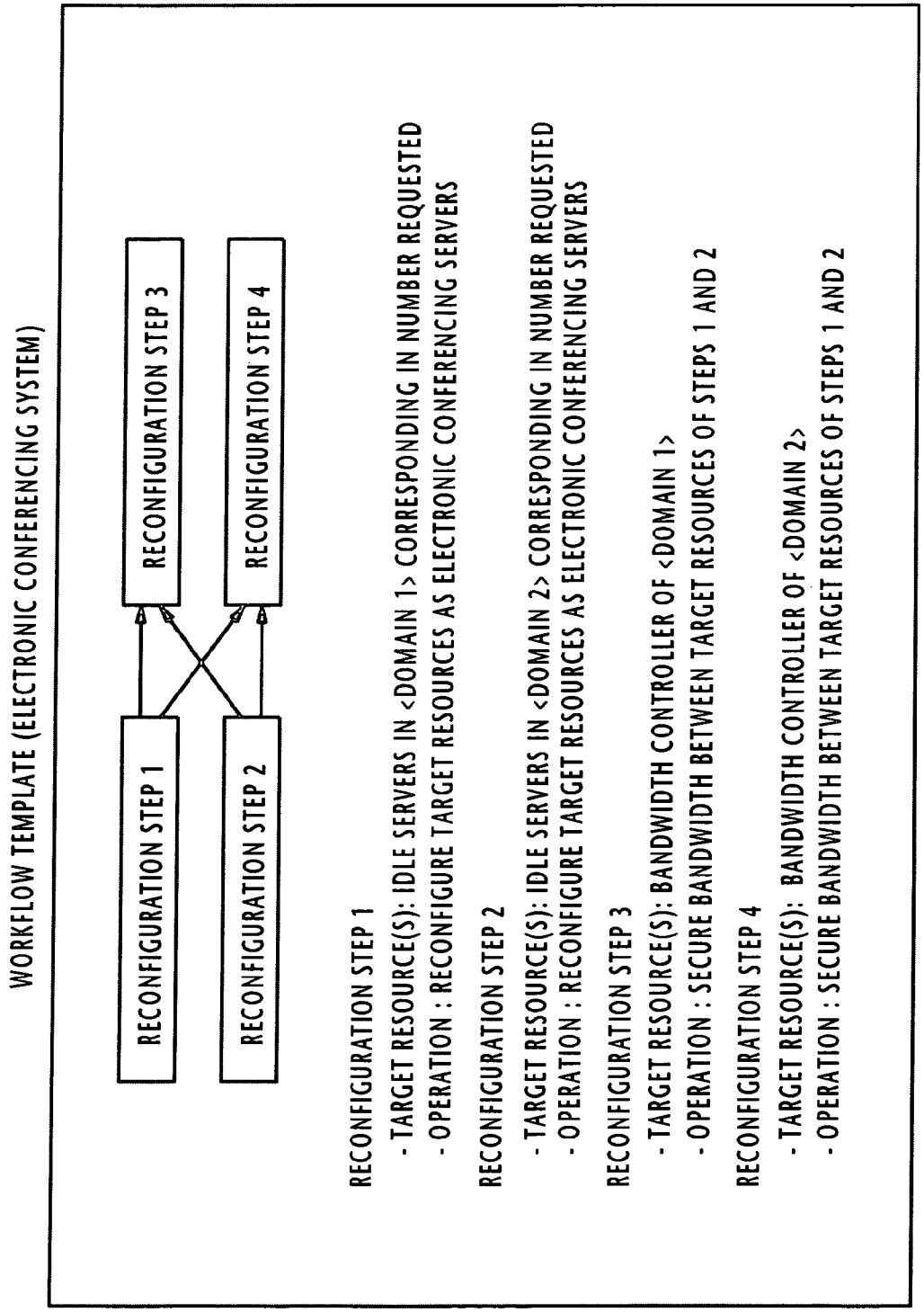

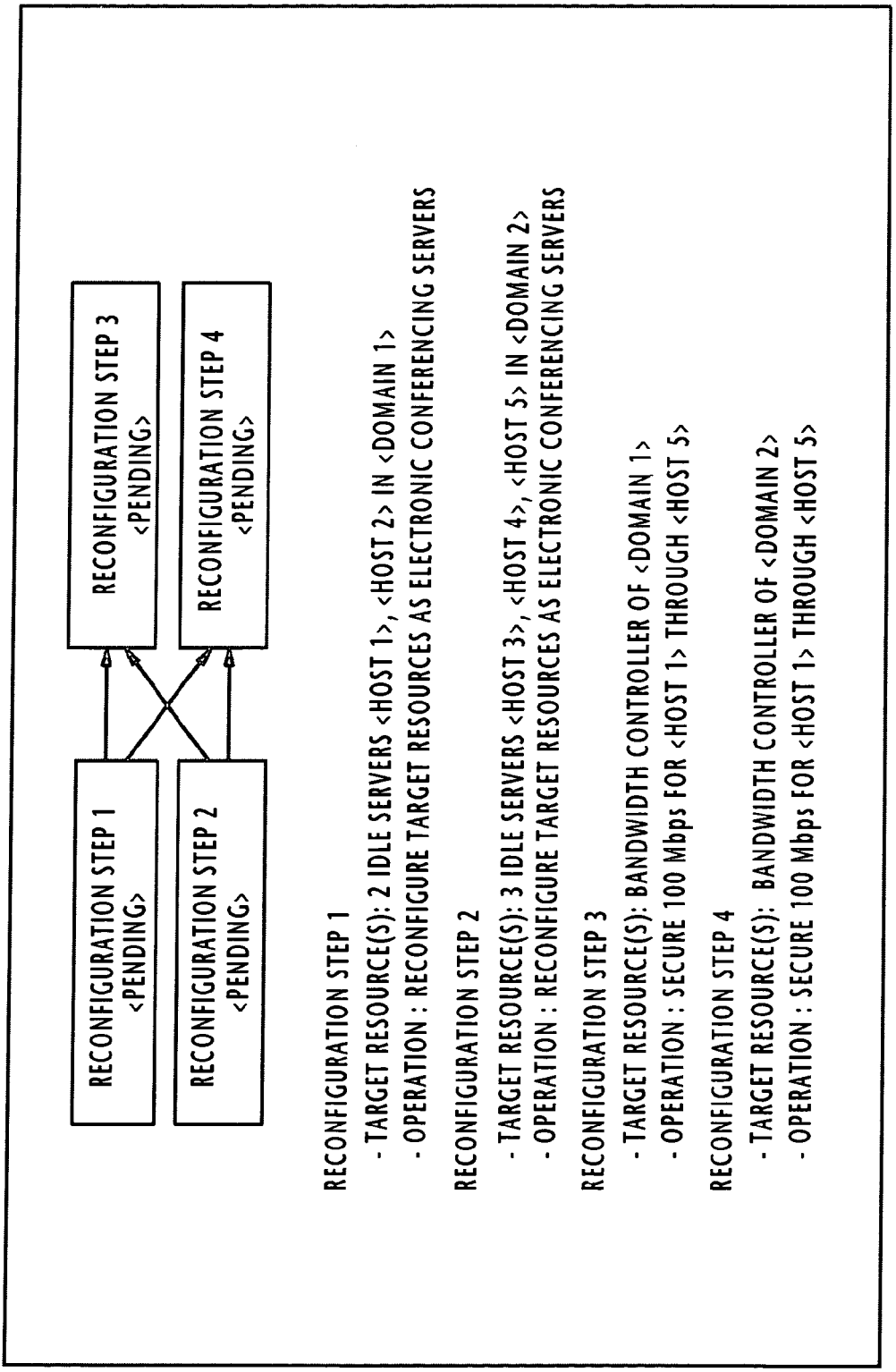

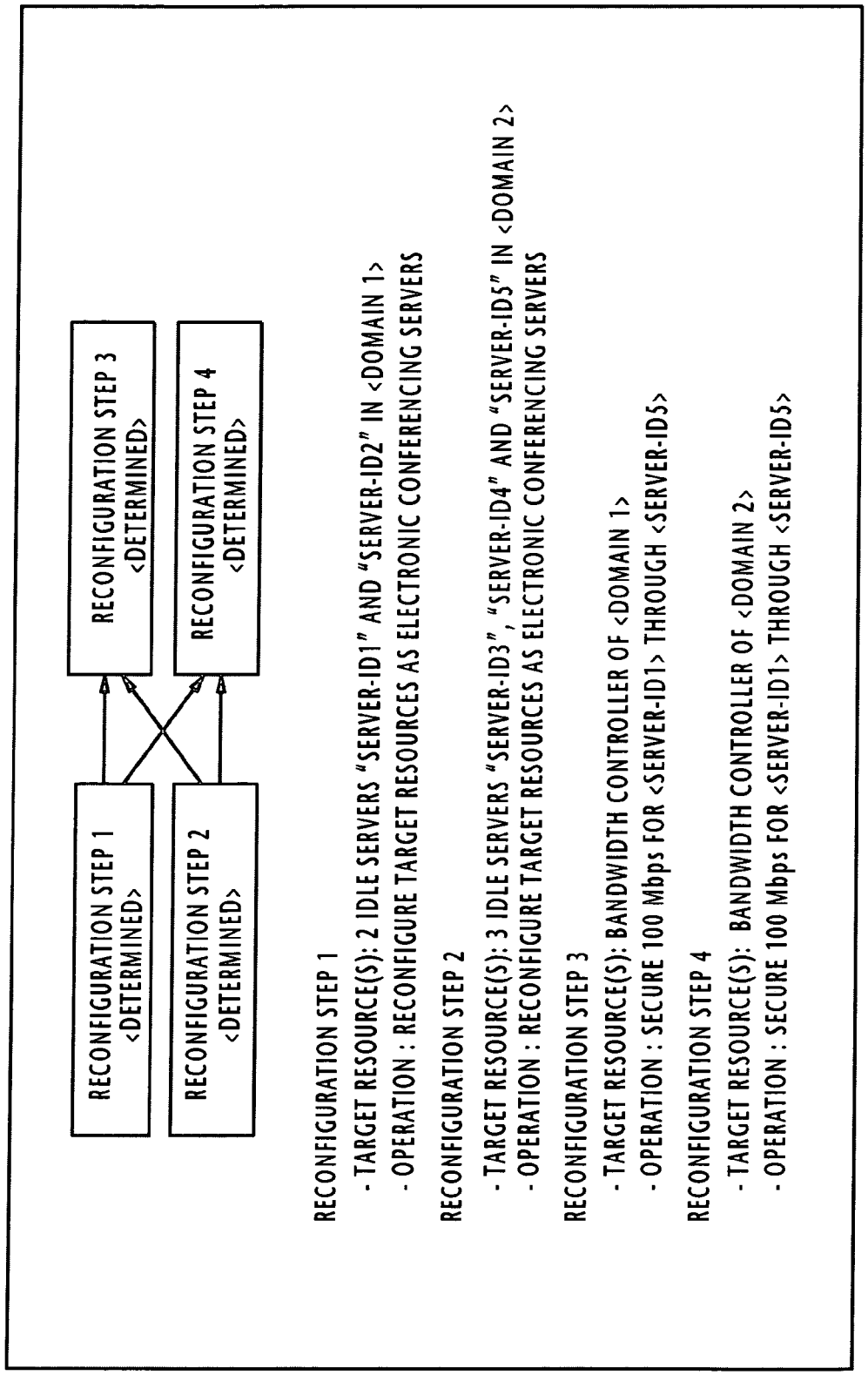

FIG. 9A-1

INITIAL STATE (RESOURCE MANAGER 3-1)

| RESOURCE ID | CURRENT STATE | NEW STATE |
|---|---|---|
| SERVER-ID1 | IDLE | NONE |
| SERVER-ID2 | IDLE | NONE |
| BANDWIDTH CONTROLLER 4B-1 | AVAILABLE BANDWIDTH = 800 Mbps | NONE |

FIG. 9B-1

AFTER FEASIBILITY TEST

| RESOURCE ID | CURRENT STATE | NEW STATE |
|---|---|---|
| SERVER-ID1 | IDLE | (1) ELECTRONIC CONFERENCING SERVER |
| SERVER-ID2 | IDLE | (1) ELECTRONIC CONFERENCING SERVER |
| BANDWIDTH CONTROLLER 4B-1 | AVAILABLE BANDWIDTH = 800 Mbps | (3) CAPABLE OF SUPPORTING 100 MBPS |

FIG. 9C-1

AFTER RECONFIGURATION

| RESOURCE ID | CURRENT STATE | NEW STATE |
|---|---|---|
| SERVER-ID1 | ELECTRONIC CONFERENCING SERVER | NONE |
| SERVER-ID2 | ELECTRONIC CONFERENCING SERVER | NONE |
| BANDWIDTH CONTROLLER 4B-1 | AVAILABLE BANDWIDTH = 700 Mbps | NONE |

FIG. 9A-2
INITIAL STATE (RESOURCE MANAGER 3-2)

| RESOURCE ID | CURRENT STATE | NEW STATE |
|---|---|---|
| SERVER-ID3 | IDLE | NONE |
| SERVER-ID4 | IDLE | NONE |
| SERVER-ID5 | IDLE | NONE |
| BANDWIDTH CONTROLLER 4B-2 | AVAILABLE BANDWIDTH = 100 Mbps | NONE |

FIG. 9B-2
AFTER FEASIBILITY TEST

| RESOURCE ID | CURRENT STATE | NEW STATE |
|---|---|---|
| SERVER-ID3 | IDLE | (2) ELECTRONIC CONFERENCING SERVER |
| SERVER-ID4 | IDLE | (2) ELECTRONIC CONFERENCING SERVER |
| SERVER-ID5 | IDLE | (2) ELECTRONIC CONFERENCING SERVER |
| BANDWIDTH CONTROLLER 4B-2 | AVAILABLE BANDWIDTH = 100 Mbps | (3) CAPABLE OF SUPPORTING 100 MBPS |

FIG. 9C-2
AFTER RECONFIGURATION

| RESOURCE ID | CURRENT STATE | NEW STATE |
|---|---|---|
| SERVER-ID3 | ELECTRONIC CONFERENCING SERVER | NONE |
| SERVER-ID4 | ELECTRONIC CONFERENCING SERVER | NONE |
| SERVER-ID5 | ELECTRONIC CONFERENCING SERVER | NONE |
| BANDWIDTH CONTROLLER 4B-1 | AVAILABLE BANDWIDTH = 0 Mbps | NONE |

US 8,024,740 B2

ACQUISITION SYSTEM FOR DISTRIBUTED COMPUTING RESOURCES

BACKGROUND OF THE INVENTION

1. Field of the Invention

The present invention relates to a resource acquisition system and method for distributed computing resources.

2. Description of the Related Art

As described in a document titled "A Resource Management Architecture for Metacomputing Systems", Karl Czajkowski et al, Proc. 4th IPPS/SPDP Workshop on Job Scheduling Strategies for Parallel Processing, pp. 62-82, 1998, the prior art resource acquisition system for distributed computational resources is essentially composed of a broker, an information service provider and a number of resource allocation managers located in respective administrative domains, all of which are interconnected by a communications network. The information service provider maintains resource information, which is periodically updated by the resource allocation managers. For the management of its local computing resources each resource allocation manager is provided with a gatekeeper, a job manager, a local resource manager and a reporter. In resource acquisition, resource user's data is entered to a client terminal and a resource acquisition request is sent from the terminal via the network to the broker, inquiring it about computing resources that satisfy the client's requirements. The broker acquires necessary information from the information service provider and selects appropriate resources and sends information back to the client, indicating the selected resources.

Next, the client terminal requests one or more resource allocation managers to perform reconfiguration on the selected resources by specifying a particular job such as "starting up of an application program" or "guaranteeing a network bandwidth". In each resource allocation manager, the gatekeeper is responsible for receiving the client's job and activating the job manager, which in turn hands it over to the local resource manager to perform the job on the target resources. However, the following shortcomings exist in the prior art system.

First, if a resource reconfiguration involves a consecutive series of operations whose executions are constrained to a particular order due to their hierarchically dependent relationships (such as between selection of servers and selection of routes for linking the servers), it usually takes a long time to complete. If one operation fails, subsequent operations cannot proceed and a rollback or compensation must be performed on all reconfigured resources to restore them to original configuration. This represents a substantial waste of time to both users and resource providers.

Therefore, a need does exist to allow users to check in advance to see if all steps of reconfiguration can successfully proceed.

Second, if target resources are scattered over different domains and the intended reconfiguration is such that hierarchically dependent relations exist between different domains, a central management entity, such as the broker, would take responsibility for obtaining resource information from all domains. However, the amount of burden the central management entity would take in selecting resources would become enormous as the distributed computing system grows in size and complexity.

Therefore, there exists a need to allow inter-domain reconfiguration operations to proceed without concentrating processing loads on a single management entity.

SUMMARY OF THE INVENTION

It is therefore an object of the present invention to provide a resource acquisition system and method for a distributed computing system capable of communicating to users an advance report that indicates whether intended reconfiguration can or cannot successfully proceed.

Another object of the present invention is to provide a resource acquisition system and method for a distributed computing system, capable of balancing processing loads when requested target resources are scattered across different administrative domains.

A further object of the present invention is to provide a resource acquisition system and method for a distributed computing system, capable of reducing average time taken to reconfigure computing resources by separating the whole sequence into a verification (preparation) phase and a reconfiguration phase.

A further object of the present invention is to provide a resource acquisition system and method for a distributed computing system, capable of reducing average time taken to reconfigure computing resources inter-related between different domains by successively selecting computing resources in order based on a reconfiguration workflow and in order based on hierarchically dependent relationships between inter-domain resources.

A still further object of the present invention is to provide a resource acquisition system and method for a distributed computing system in which a scheduler is responsible for selecting an administrative domain or domains and a resource manager in the selected domain is responsible for selecting individual computing resources, so that resources are interactively and hierarchically acquired between the scheduler and the resource manager.

A still further object of the present invention is to provide a resource acquisition system and method for a distributed computing system, capable of reducing possibility of accessibility check errors by separating the whole reconfiguration sequence into verification and reconfiguration phases and making a comparison between the results of verification and reconfiguration.

According to a first aspect of the present invention, there is provided a resource manager comprising verification mechanism, responsive to a verification request, for reconfiguring a computing resource, verifying that the computing resource is reconfigurable if the reconfigured resource is legitimately accessible, and formulating a verification report containing the identifier of the verified computing resource, and reconfiguration mechanism, responsive to a reconfiguration request which is formulated in response to the verification report, for reconfiguring the verified computing resource.

According to a second aspect, the present invention provides a resource acquisition system comprising a communications network, a first entity, connected to the network, for receiving a resource acquisition request from a client terminal, determining at least one location of computing resources indicated in the resource acquisition request, and transmitting to the at least one determined location a verification request specifying a resource and an operation, and a second entity, connected to the network in the determined location, for receiving the verification request and performing reconfiguration of the specified resource according to the specified operation and verifying that the resource is reconfigurable if the reconfigured resource is legitimately accessible, and transmitting back to the first entity a verification report containing the identifier of the reconfigurable resource. The first entity is further responsive to the verification report from the second entity for transmitting to the second entity a reconfiguration request to perform the reconfiguration on the verified resource.

The first entity and the second entity may repeatedly exchange the verification request and the verification report for successively reconfiguring each of a plurality of computing resources according to hierarchically dependent relationships that exist between the successively reconfigured computing resource.

According to a third aspect, the present invention provides a resource acquisition system comprising a communications network, a plurality of distributed computing resources located in a plurality of administrative domains, and a plurality of resource managers respectively located in the administrative domains and connected to the network, each resource manager performing management of the computing resources located in the same domain as the resource manager. A scheduler is connected to the network for receiving a resource acquisition request from a client terminal via the network, determining at least one administrative domain and transmitting to the network a verification request specifying a computing resource and an operation. At least one of the resource managers is responsive to the verification request for performing reconfiguration of the specified resource according to the specified operation and verifying that the resource is legitimately reconfigurable, and transmitting back to the scheduler a verification report containing the identifier of the reconfigurable resource. The scheduler is responsive to the verification report for transmitting a reconfiguration request to the at least one resource manager to perform reconfiguration on the verified resource.

According to a fourth aspect, the present invention provides a method of performing reconfiguration on distributed computing resources. The method comprises the steps of (a) receiving a verification request specifying a successive group of resource operation pairs and performing reconfiguration of the specified resource according to the specified operation, (b) verifying that the specified resource is reconfigurable if the reconfigured resource is legitimately accessible, (c) formulating a verification report containing the identifier of the reconfigurable resource, and (d) receiving a reconfiguration request, which is formulated in response to the verification report, and performing reconfiguration of the verified resource.

According to a fifth aspect, the present invention provides a method of performing reconfiguration on distributed computing resources, comprising the steps of (a) receiving a verification request and selecting a computing resource according to the received request, (b) making a reference to a resource database, performing reconfiguration of the referenced resource and verifying that the referenced resource is legitimately reconfigurable if accessibility to the reconfigured resource is established, (c) transmitting a verification report containing the resource identifier of the reconfigurable resource, and (d) receiving a reconfiguration request containing the resource identifier and updating the resource database with the resource identifier.

According to a further aspect, the present invention provides a resource acquisition method comprising the steps of (a) at a first location, transmitting a verification request specifying each group of multiple reconfiguration groups of resource operation pairs, (b) at a second location, receiving the verification request and performing reconfiguration of the specified resource according to the specified operation, (c) at the second location, verifying that the specified resource is reconfigurable if the resource can be legitimately accessible, (d) at the second location, formulating a verification report containing the identifier of the reconfigurable resource and transmitting the verification report to the first location, (e) at the first location, receiving the verification report and transmitting a reconfiguration request to the second location, and (f) at the second location, receiving the reconfiguration request and performing reconfiguration of the verified resource.

BRIEF DESCRIPTION OF THE DRAWINGS

The present invention will be described in detail further with reference to the following drawings, in which:

FIG. 1 is a block diagram of a resource acquisition system of the present invention for distributed computing resources;

FIGS. 2A, 2B and 2C are illustrations of workflow which is maintained by a scheduler;

FIGS. 3A, 3B and 3C are illustrations of a resource status table maintained by a resource manager;

FIG. 4 is a sequence diagram of the resource acquisition system for describing flow of various request and report messages between the scheduler and the resource managers;

FIG. 5A is a flowchart of the operation of the scheduler when it performs workflow generation subroutine;

FIG. 5B is a flowchart of the operation of the scheduler when it performs workflow updating subroutine in which it repeatedly exchanges verification requests and verification reports with one or more resource managers to verify requested target computing resources on a group-by-group basis;

FIGS. 6A and 6B are flowcharts of the operation of each resource manager when it performs verification on requested target computing resources in response to verification requests from the scheduler;

FIG. 6C is a flowchart of the operation of the scheduler when it performs reconfiguration on verified target resources in response to reconfiguration requests from the scheduler;

FIG. 6D is a flowchart of operation when a cancellation process is performed in response to receipt of a cancellation request from the scheduler;

FIGS. 8A, 8B and 8C are illustrations of workflow which is maintained by the scheduler of FIG. 7;

FIGS. 9A-1, 9B-1 and 9C-1 are illustrations of a resource status table maintained by the resource manager of a first domain of FIG. 7; and FIGS. 9A-2, 9B-2 and 9C-2 are illustrations of a resource status table maintained by the resource manager of a second domain of FIG. 7.

DETAILED DESCRIPTION

Figure 5C:
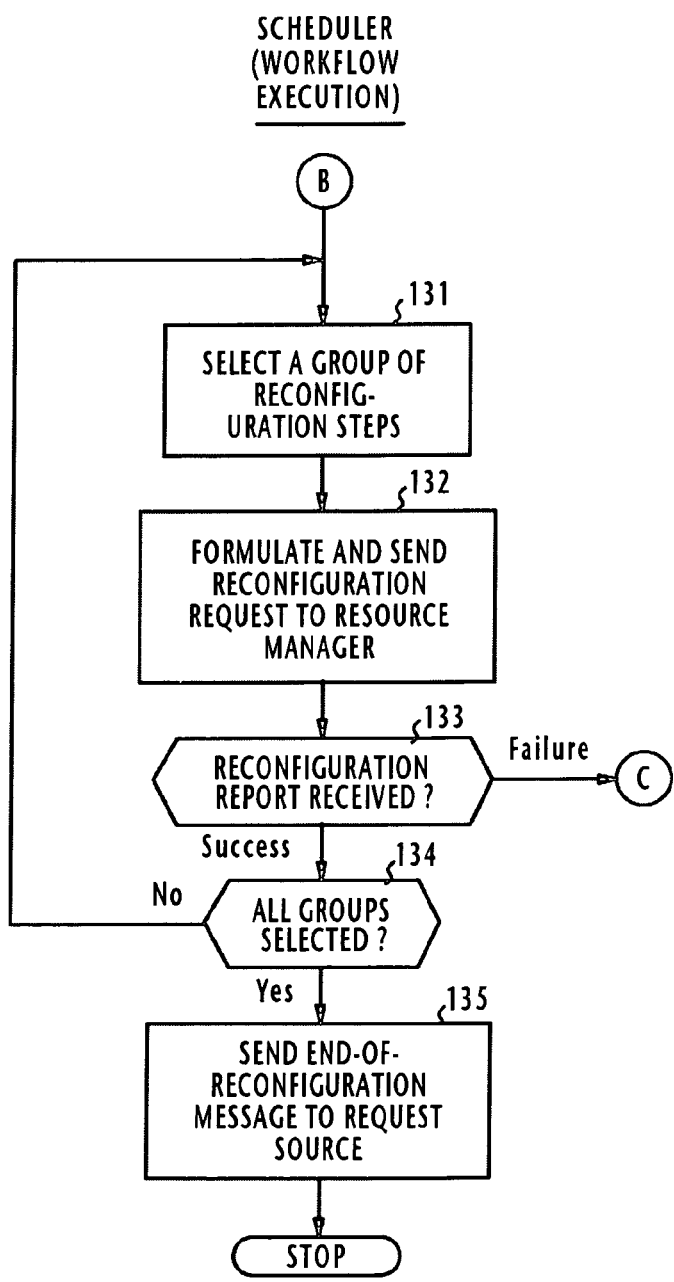
FIG. 5C is a flowchart of the operation of the scheduler when it performs workflow execution subroutine in which it repeatedly requests the resource managers to perform reconfiguration on verified computing resources.

In FIG. 1, there is schematically shown a resource acquisition system for distributed computing resources according to the present invention. The system is comprised of a client terminal 1, a scheduler 2 and a plurality of resource managers 3 associated with multiple computing resources 4 (such as host computers, switches, routers, load balancers, bandwidth controllers and storage devices) located in respective administrative domains 5. A communications network 6, such as WAN (wide area network) or LAN (local area network) or a combination of both, establishes connections between the client terminal 1, the scheduler 2 and the resource managers 3.

Alternatively, the computing resources may be connected to the associated resource managers via the communications network 6 and the scheduler 2 may be directly connected to the resource managers.

Scheduler 2 includes a processor 22, connected to the network 6 via a line interface 21, a workflow template memory 23 and a resource database 24. Workflow template memory 23 maintains a plurality of workflow templates corresponding to different patterns depending on application types.

As described later, the processor 22 at scheduler 2 responds to a resource acquisition request from the client terminal 1 by retrieving a workflow template from the workflow template store 23. One example of the workflow template is shown in FIG. 2A. The example workflow template comprises a plurality of reconfiguration steps, which are divided into successive groups and in which parent-child relationships are established between the groups, as indicated by arrowhead lines, as represented by a directed acyclic graph, a directed graph with no path that starts and ends at the same vertex, known as DAG. Each reconfiguration step specifies target resources corresponding in number requested by the client and an operation to be performed on the specified target resources.

The reconfiguration workflow may be manually prepared in advance so that both dependent relationship between "resource selections" and dependent relationships between "reconfiguration operations" are satisfied.

Processor 22 adds necessary information to the template according to the contents of the received message to generate an "initial workflow" as shown in FIG. 2B. In this initial workflow, the target resources are specified in a categorical term (such as hosts) with a serial number and the specific operation to be performed on the specified target resources. All stages of the initial workflow are indicated as <pending>. Scheduler 2 selects one of the groups of reconfiguration steps in the hierarchical order.

Resource database 24 maintains resource data representing the locations of computing resources available in the resource acquisition system. Using the resource database 24, the processor 22 determines destination domains and identifies destination resource managers and formulates a verification request message with the selected group of reconfiguration data and transmits the verification request to each of the destination resource managers 3.

Each resource manager 3 includes a processor 32, connected to the network 6 via a line interface 31, a resource database 33 and a reconfiguration data memory 34. Resource database 33 maintains the database of the associated computing resources 4, which is updated when the computing resources are reconfigured. Reconfiguration data memory 34 is used for mapping reconfiguration steps requested by the client to reconfiguration steps verified by the resource manager.

Processor 32 is responsive to the verification request from the scheduler 2 for performing a verification (reconfiguration feasibility) test on the target resources specified in the received request and sends a test report back to the scheduler 2.

If the verification test is proved to be successful, the scheduler 2 updates the initial workflow with the actual resource names and their identity contained in the test report and replaces the <pending> mark with a <determined> mark. The verification test is repeated on the next group of reconfiguration steps if the previous test is proved to be successful. As a result, if all reconfiguration steps are verified, the initial workflow will be updated as a final workflow as shown in FIG. 2C.

When verification tests are repeated between the scheduler 2 and each resource manager 3, the processor 32 of the resource manager updates its resource database 33 successively. Corresponding to the workflows of FIGS. 2A to 2C, the resource database 33 is updated as shown in FIGS. 3A to 3C. Details of FIGS. 2A~2C, 3A~3C will be described later.

The operation of the resource acquisition system proceeds generally according to the sequence diagram of FIG. 4 and more specifically according to the flowcharts of FIGS. 5A~5C and 6A~6D.

As illustrated in FIG. 4, the whole sequence is generally divided into a verification phase in which resource selection, verification testing and request cancellation (if necessary) are performed, and a reconfiguration phase in which verified steps of reconfiguration are executed. During the verification phase, resource selection is first performed by the scheduler which determines an administrative domain from which to acquire target computing resources and then jointly by the scheduler and the resource manager located in the determined domain. In successive hierarchical order, the scheduler and the resource manager select a group of target resources according to resource type and resource quantity in an interactive manner until all groups of target resources are selected. If target resources are located in separate domains, the scheduler is responsible for directly selecting the target resources from each domain.

If a selected target resource is verified by a resource manager that it can be legitimately acquired for the client, the resource manager communicates the ID of the verified resource to the scheduler. The verification process may be repeated a number of times (passes). If the target resources are servers and network elements, a number of servers are selected in a first pass and then network elements are selected in a second pass. If verification fails in a resource manager, the scheduler is so informed and sends a cancellation request to the resource manager to request it to cancel the received verification request.

When all the requested resources are verified, the scheduler is so informed and selects, during the reconfiguration phase, a group of reconfiguration steps according to hierarchical order and requests one or more resource managers to perform the selected reconfiguration steps on specified target resources. If a resource manager fails to reconfigure a verified resource, it performs a "rollback" operation on the verified resource and sends back a reconfiguration report to the scheduler for indicating that the requested reconfiguration has failed.

The following is a detailed description of the operation of scheduler 2 and resource managers 3.

In response to a resource acquisition request 40 from the client terminal 1, the scheduler 2 performs a workflow generation subroutine 41 (FIG. 4). In FIG. 5A, the scheduler 2 proceeds from block 101 to block 102 to make a search through the template memory 23 for a workflow template corresponding to application type contained in the received request message (block 103). If a corresponding workflow template is not found in the memory 23, flow proceeds to block 105 to send a failure report to the client terminal 1. If the decision is affirmative in block 103, the scheduler 2 proceeds to block 104 to retrieve the corresponding workflow template (FIG. 2A) from the memory 23 and sets the quantity of the requested computing resources such as the number of servers or network bandwidth to produce an initial reconfiguration workflow (FIG. 2B).

Scheduler 2 proceeds to workflow updating subroutine 42 in FIG. 5B, in which it selects, from the initial workflow, a group of reconfiguration steps which depends on a parent group which is indicated by a <determined> mark (block 111). If the group is at the highest rank in the hierarchical order, there is no parent group. If this is the case, the first group of reconfiguration steps is selected. In the case of FIG. 2B, the scheduler 2 initially selects the first group of reconfiguration steps 1 and 2.

In block 112, the scheduler 2 selects an administrative domain and formulates a verification request with the address of the resource manager of the selected domain, such as the host name and URL (uniform resource locator) and with the selected reconfiguration steps (block 113) and transmits the verification request to the selected resource manager (block 114) as indicated by numeral 43 in FIG. 4 and waits for a verification test report 45 (FIG. 4) from the resource manager 3. If more than one administrative domain exists for the requested computing resources, the same verification request will be sent simultaneously to a number of resource managers.

Figure 6A:
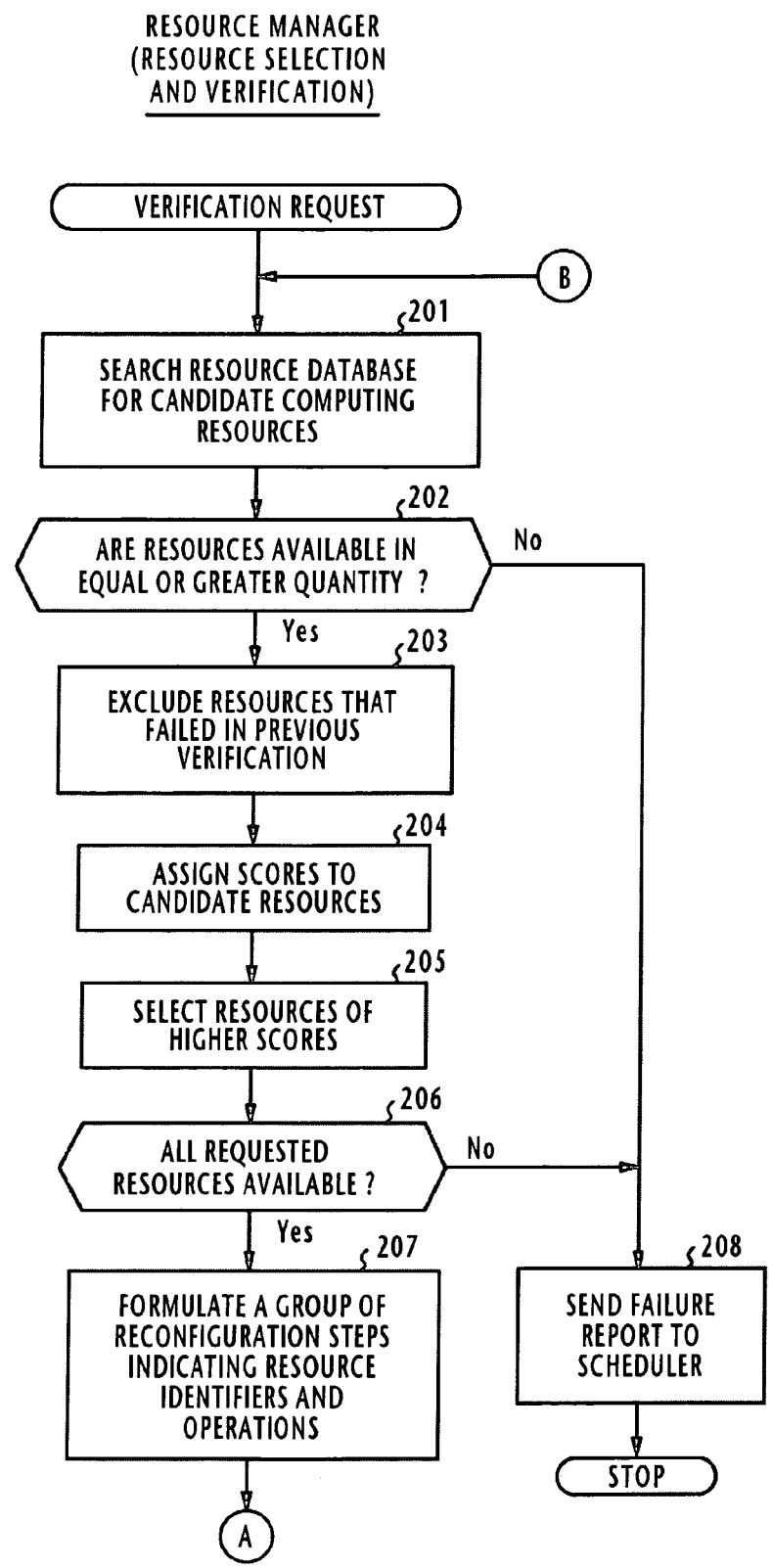

Referring to FIG. 6A, the resource manager performs resource selection and verification subroutine 44 (FIG. 4) in response to the verification request 43, starting with block 201 in which the resource database 33 is searched for candidate computing resources of the requested type and equal or greater in quantity than the requested quantity. If the number of available candidate resources is smaller than that requested (block 202), flow proceeds to block 208 to send a failure report to the scheduler 2. If the number of candidate resources is equal to or greater than that requested, flow proceeds to block 203 to exclude resources from the selected group of resources that are not verified in the previous test. In block 204, scores are assigned to candidate computing resources of the selected group according to CPU performance and storage capacity and charges, for example. Then, the resource manager 3 selects, in block 205, a plurality of candidate computing resources in descending order of score equal in number to the requested quantity. If all requested resources are not selected (block 206), flow proceeds to block 208 to send a failure report to the scheduler 2. If all requested resources are selected, flow proceeds from block 206 to block 207 to formulate a group of reconfiguration steps indicating the identifiers of the selected resources and operations.

In FIG. 6B, the resource manager 3 creates a resource status table as illustrated in FIG. 3A in the resource database 33 for mapping resource IDs to their current states which are initially "idle" and their new states which are initially indicated "none" (block 211). In block 212, the resource manager selects a step from the formulated group of reconfiguration steps and performs the operation specified in the selected reconfiguration step on the specified resource and updates the status of the reconfigured resource in the resource status table. In blocks 214 and 215, ownership (right of access) check is made on the reconfigured resource to verify that the target resource can be legitimately reconfigured.

One example of the ownership check involves the use of an access control list to verify that the user ID of the requesting terminal is contained in the access control list. Another ownership check involves a comparison between user identifiers if such identifiers are contained in the current and new state fields of the resource status table. Assume that a front-end server (SERVER-ID1) is reconfigured as add-on to a back-end server (SERVER-ID2). The new state field of the front-end server will be indicated as "reconfigured as add-on to back-end server", while the new state field of the back-end server is indicated as "none". Then, the resource manager determines whether the user ID contained in the new state field of SERVER-ID1 matches the user ID contained in the current state field of SERVER-ID2. If they match, ownership (right of access) is granted.

If it is determined that the target resource can be legitimately reconfigured, flow proceeds to block 216 to update the resource status table by setting the reconfigured state of the resource in the new state field of the table as shown in FIG. 3B. Otherwise, flow returns to block 201 to repeat the resource selection process for a further search through the resource database for another list of available computing resources.

After all reconfiguration operations of the group are performed (block 217), the new state fields of the resource status table will be completely filled in with information representing the status of the reconfigured resources as shown in FIG. 3B. In block 218, the resource manager 3 stores the data of the verified reconfiguration steps and the identifiers of the verified resources in the reconfiguration data memory 34 and proceeds to block 219 to transmit a verification report 45 (FIG. 4) to the scheduler 2, containing the identifiers of the verified target resources and the reconfiguration operation to be performed.

Afterwards, when reconfiguration is actually performed in response to a reconfiguration request from the scheduler 2, the current states of all entries of the resource status table will be updated with the information of the new state fields and the new states will be marked "none", as shown in FIG. 3C.

Returning to FIG. 5B, the scheduler 2 receives a verification (success) report or a verification failure report from the resource manager (block 115). If the scheduler receives a verification report for the selected group of reconfiguration steps, flow proceeds to block 116 to update the initial workflow (FIG. 2B) by replacing the <pending> mark on the verified group of reconfiguration steps with a <determined> mark and replacing the resource names with the resource identifiers contained in the verification report as shown in FIG. 2C. Flow proceeds to block 117 to check to see if all reconfiguration steps are verified. If not, flow returns to block 111 to repeat the process on the next group that depends on the determined parent group. As a result, a second group of reconfiguration steps 3 and 4 (FIG. 2B) is selected (block 111) and the same process is repeated. If reconfiguration steps 3 and 4 are verified, reconfiguration step 5 will be selected and checked for verification.

If the resource manager receives a failure report (block 115), flow proceeds from block 115 to block 118 to determine whether the non-verified computing resources can be replaced with other resources. If the decision is affirmative, flow returns to block 111 to repeat the process. Otherwise, flow proceeds to block 119 to transmit a cancellation request to the associated resource manager for canceling the previously transmitted verification request and transmit a failure notification to the client terminal 1 (block 120). As a result, verification requests and verification reports are exchanged a number of times successively on a group-by-group basis in hierarchical order between the scheduler 2 and the associated resource managers 3.

If all reconfiguration steps are verified, the scheduler 2 proceeds from block 117 to block 131 (FIG. 5C) to workflow execution subroutine 46 (FIG. 4) by selecting a group of reconfiguration steps from the verified reconfiguration steps contained in the verification report. In block 132, a reconfiguration request is formulated with the selected group of reconfiguration steps and transmitted to the resource manager, waiting for a returning reconfiguration report (block 133). When a reconfiguration report is received from the resource manager (block 133), the scheduler 2 determines if the report indicates that the requested reconfiguration steps are successfully performed. If the decision is affirmative, flow proceeds to block 134 to check to see if all groups are selected. If not, flow returns to step 131 to repeat the process. If all groups are selected, flow proceeds to block 135 to transmit an end-of-reconfiguration message 50 (FIG. 4) to the client terminal 1. If the reconfiguration report indicates that the requested reconfiguration has failed, flow proceeds from block 133 to block 119 (FIG. 5A) to transmit a cancellation request to the resource manager and a failure notification to the client terminal 1 (block 120).

In FIG. 6C, the resource manager receives the reconfiguration request from the scheduler 2 to perform reconfiguration subroutine 48 (FIG. 4) by storing the received request in the reconfiguration data memory 34 (block 231). In block 232, a sequence of reconfiguration steps is read out of the reconfiguration data memory 34 corresponding to the reconfiguration steps contained in the stored reconfiguration request and one of the reconfiguration steps is selected from that sequence (block 233) and the operation specified by the selected step is executed on the target resources specified by the selected step (block 234). If the specified operation is executed successfully on the specified resources (block 235), flow proceeds to block 236 to update the current and new states of the entry corresponding to the reconfigured resource in the resource status table, as shown in FIG. 3C. Blocks 233 to 236 are repeated until all reconfiguration steps are executed (block 237). When the all reconfiguration steps are executed, flow proceeds to block 238 to delete the reconfiguration request from the reconfiguration data memory 34 and transmits a reconfiguration report to the scheduler 2, indicating that the requested computing resources are successfully reconfigured (block 239).

If one of the selected reconfiguration steps is not successfully executed, the decision in block 235 is negative and flow proceeds to block 240 to perform a rollback operation so that the target resources and resource database are restored to original state. Resource manager 3 deletes the reconfiguration request from the reconfiguration data memory 34 (block 238) and transmits a reconfiguration report 49 (FIG. 4) to the scheduler (block 239), indicating that reconfiguration has failed.

In FIG. 6D, the resource manager receives a cancellation request 51 (FIG. 4) from the scheduler 2 during the verification phase (block 241). As mentioned earlier with respect to block 119 of FIG. 5B, the scheduler 2 transmits a cancellation request to the resource manager when a verification (feasibility) test indicates that it has failed in verifying reconfiguration. In response to the received cancellation request, the resource manager searches through a message queue provided in the line interface 31 for a verification request that corresponds to the cancellation request. If the corresponding verification request is detected, flow proceeds from block 242 to block 248 to delete the corresponding verification request from the message queue and a cancellation report 52 (FIG. 4) is sent back to the scheduler 2 (block 247). If no corresponding verification request is detected, flow proceeds to block 243 to search through the reconfiguration data memory 34 for a corresponding sequence of verified reconfiguration steps. If the resource manager detects the corresponding sequence, it erases the update data from the new state field of the resource status table (FIG. 3C) (block 245). This cancellation process is in reverse to what is performed by blocks 211 to 215 of FIG. 6B. Flow proceeds to block 246 to delete the detected sequence of verified reconfiguration steps (detected in block 243) from the reconfiguration data memory 34. A cancellation report 52 is also sent back to the scheduler either when block 246 is executed or when negative decision is made in block 244.

In response to the cancellation report 52, the scheduler 2 returns a failure notification 53 to the client terminal 1 (block 120).

The following is a description of a first example of resource acquisition with reference to FIGS. 2A, 2B, 2C, 3A, 3B and 3C. In this example, the present invention is implemented in a WWW application in which five World Wide Web (WWW) servers are acquired as front-end processors and one application server is acquired as a back-end processor. Such a WWW application is extensively used on the Internet as shopping service and electronic commerce. In this application, another target resource is the load balancer. Each of the WWW servers operates on a program known as "Apache HTTP Server" distributed from Apache Software Foundation and the application server operates on a program known as "Tomcat" distributed from the same source. The WWW servers may execute a process requested from an HTTP client by calling the application server. Each WWW server maintains the address of the application server as a destination and the destination address of a WWW server is maintained in an application. Each server is provided with an agent program for providing start/stop control on each application program according to a message from the associated resource manager.

The load balancer is responsible for balancing traffic loads (connection requests) on the WWW servers. The load balancer may be provided with an agent program for providing add/delete configuration control on the WWW servers in response to a command message from the associated resource manager. The network administrator at the client terminal 1 enters the number of required WWW servers to be reconfigured into the WWW application and the number of required application servers to be reconfigured into the WWW application. These items of control data are included in a resource acquisition request and transmitted to the scheduler 2, using a protocol known as SOAP (Simple Object Access Protocol). Client terminal 1 may use an API (Application Programming Interface) such as JAX-RPC (Java API for XML-Based Remote Procedure Call) for transmitting a request message via SOAP.

On receiving the resource acquisition request, the scheduler 2 performs workflow generation subroutine (FIG. 5A) in which it retrieves a workflow template as shown in FIG. 2A from the template memory 23 (block 102) and enters the quantity data into the workflow template and indicates all reconfiguration steps as <pending> and all unknown target resources and their identity as <HOST 1>, for example, to produce an initial workflow (block 104).

Specifically, as illustrated in FIG. 2B, reconfiguration step 1 indicates target resources identified as <HOST 1>, <HOST 2>, <HOST 3>, <HOST 4> and <HOST 5> and an operation specifying an instruction to reconfigure the target resources as WWW servers.

Reconfiguration step 2 indicates one target resource identified as <HOST 6> and an operation for reconfiguring the target resource as an application server.

Reconfiguration step 3, which depends on steps 1 and 2, indicates target resources identified as <HOST 1>, <HOST 2>, <HOST 3>, <HOST 4> and <HOST 5> and an operation for setting the identity of <HOST 6> to the target resources of step 1.

Reconfiguration step 4, which depends on parent steps 1 and 2, indicates the resource of step 2 (i.e., <HOST 6> as its target resource and an operation for setting the identities of all target resources of step 1 to <HOST 6>.

Reconfiguration step 5, which depends on parent steps 3 and 4, indicates the load balancer as its target resource and an operation for setting the identities of all target resources of step 1 to the load balancer.

In workflow update subroutine (FIG. 5B), the scheduler 2 transmits a verification request to the resource manager and receives a verification report from the resource manager. By repeating the exchange of these requests and reports, the initial workflow is successively updated on a group-by-group basis, producing a final workflow (FIG. 2C) in the scheduler 2 and an initial resource status table (FIG. 3A) in the resource manager 3. In the illustrated example of FIG. 2A, reconfiguration steps 1 and 2 are first verified (determined), and then steps 3 and 4, and finally step 5.

Therefore, in the first exchange of verification request and verification report, reconfiguration steps 1 and 2 are performed and <SERVER-ID1>, <SERVER-ID2>, <SERVER-ID3>, <SERVER-ID4> and <SERVER-ID5> are determined for <HOST 1>, <HOST 2>, <HOST 3>, <HOST 4> and <HOST 5>, respectively, and <SERVER-ID6> is determined for <HOST 6> and the resource status table of the resource manger is updated as shown in FIG. 3B.

In the second exchange of verification request and verification report, reconfiguration steps 3 and 4 are performed and the identity of <SERVER-ID6> is set in the new state fields of the entries of <SERVER-ID1>, <SERVER-ID2>, <SERVER-ID3>, <SERVER-ID4> and <SERVER-ID5>, and the identities of <SERVER-ID1>, <SERVER-ID2>, <SERVER-ID3>, <SERVER-ID4> and <SERVER-ID5> are set in the new state field of entry of <SERVER-ID6>.

In the final exchange of verification request and verification report, the identities of <SERVER-ID1>, <SERVER-ID2>, <SERVER-ID3>, <SERVER-ID4> and <SERVER-ID5> are set in the load balancer.

During subsequent workflow execution subroutine (FIG. 5C), the scheduler 2 formulates a reconfiguration request on a group-by-group basis using the workflow of FIG. 2C and transmits the request to the resource manager, as in the previous verification subroutine. Therefore, a total of three reconfiguration requests are sent to the resource manager; first for reconfiguration steps 1 and 2, second for reconfiguration steps 3 and 4 and finally for reconfiguration step 5. Therefore, in response to the first reconfiguration request, the resource manager 3 updates the current state fields of all entries with reconfigured server names. In response to the second reconfiguration request, the current state fields of all WWW servers are updated with the identifier of application server and the current state field of application server is updated with the identifiers of all WWW servers. After reconfiguration, the resource status table appears as shown in FIG. 3C.

Since reconfigurations are performed on a group-by-group basis during the reconfiguration phase in the same order as in the verification phase, a possible failure in reconfiguration can be reduced to a minimum.

Figure 7:
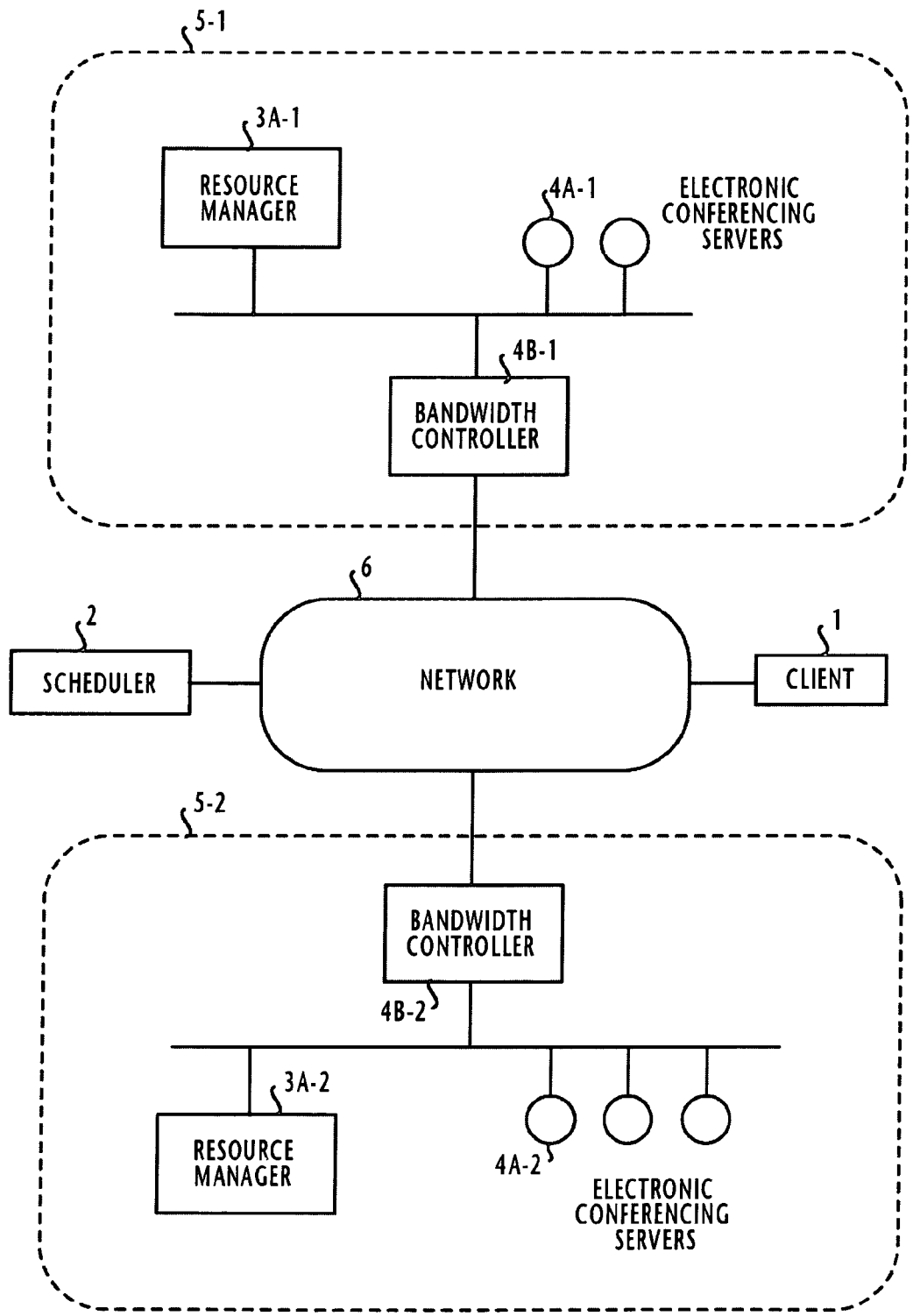
FIG. 7 is a block diagram of the resource acquisition system for reconfiguring a network of electronic conferencing servers between different administrative domains.

The present invention can be advantageously used for building an electronic conferencing system as shown in FIG. 7 with distributed computing resources.

As illustrated in FIG. 7, the electronic conferencing system is implemented with computing resources located in administrative domains 5-1 and 5-2, in which resource managers 3-1 and 3-2 are respectively associated with electronic conferencing servers 4A-1 and 4A-2 which relay audio and video information between terminals of conference participants at remote locations. More than one server is used in each location as a load balancer to distribute traffic among the terminals.

In the domains 1 and 2, bandwidth controllers 4B-1 and 4B-2 are respectively provided for connecting the associated resource managers and servers to the network 6.

As shown in FIG. 8A, the scheduler 2 generates a workflow template in response to a resource acquisition request from the client terminal 1. The request contains information requesting two electronic conferencing servers 4A-1 and one bandwidth controller 4B-1 for domain 5-1 and three electronic conferencing servers 4A-2 and one bandwidth controller 4B-2 for domain 5-2. The bandwidth controller is designed to guarantee a desired bandwidth to a number of network traffic and is known under the trade names of "PacketShaper" (Packeteer, Inc) and "NetEnforcer" (Allot Communicaitons, Ltd.).

An initial workflow (FIG. 8B) is produced when the scheduler 2 sets the quantity data of the required target resources in the entries of reconfiguration steps 1, 2, 3 and 4. A bandwidth of 100 Mbps is set in the steps 3 and 4.

Scheduler 2 transmits a first verification request containing reconfiguration step 1 to the resource manager 3-1 and a first verification request containing reconfiguration step 2 to the resource manager 3-2.

In response to the first verification request, the resource manager 3-1 performs verification on the requested target resources and sends back a first verification report to the scheduler 2 if the requested resources are verified. The first verification report contains identifiers "SERVER-ID1" and "SERVER-ID2". Resource manager 3-1 generates a resource status table as shown in FIG. 9A-1, mapping these verified servers to current (idle) and new state (none) and then updates the table after verification as illustrated in FIG. 9B-1.

Likewise, the resource manager 3-2 responds to the first verification request by performing verification on the requested target resources and sends back a second verification report to the scheduler 2 if the requested resources are verified. The second verification report contains identifiers "SERVER-ID3", "SERVER-ID4" and "SERVER-ID5". Resource manager 3-2 generates a resource status table as shown in FIG. 9A-2, mapping these verified servers to current (idle) and new state (none) and then updates the table after verification as illustrated in FIG. 9B-2.

Using the received verification reports, the scheduler 2 updates the initial workflow with the received identifiers and replaces the <pending> mark of steps 1 and 2 with a <determined> mark. Then, the scheduler 2 transmits a second verification request containing reconfiguration step 3 to the resource manager 3-1 and a second verification request containing reconfiguration step 4 to resource manager 3-2.

In response to the second verification requests, the resource managers 3-1 and 3-2 perform verification on the requested bandwidth controllers 4B-1 and 4B-2, respectively. If they are verified, the resource manager 3-1 sends back a verification report to the scheduler 2 and updates its resource status table as shown in FIG. 9B-1 with the verified bandwidth of 100 Mbps as a new state and available bandwidth of 800 Mbps, for example, set in the current state field of the table. Resource manager 3-2 sends back a verification report to the scheduler 2 and updates its resource status table as shown in FIG. 9B-2 with the verified bandwidth of 100 Mbps as a new state and available bandwidth of 100 Mbps, for example, set in the current state field of the table.

As a result, the scheduler 2 sets the bandwidth of 100 Mbps in the entries of steps 3 and 4 of the workflow and replaces their pending marks with <determined> marks, as illustrated in FIG. 8C.

In the subsequent reconfiguration phase, the scheduler 2 formulates reconfiguration requests based on the final workflow (FIG. 8C) and transmits them to the resource managers 3-1 and 3-2 respectively to perform reconfiguration on the verified target resources. Since all reconfiguration steps are divided into two groups, the scheduler successively transmits two reconfiguration requests to each of the resource managers in the same manner as in the verification phase.

Each resource manager responds to first and second reconfiguration requests from the scheduler. Resource manager 3-1 first updates its resource status table of FIG. 9B-1 so that the current state of the two servers are indicated as electronic conferencing server and subsequently updates the current state of the table by setting 700 Mbps and "none" in the new state field, as shown in FIG. 9C-1. In a similar manner, the resource manager 3-2 first updates its resource status table of FIG. 9B-2 so that the current state of the three servers are indicated as electronic conferencing server, and subsequently updates the current state of available bandwidth as zero Mbps and the new state field as "none" (FIG. 9C-2).

What is claimed is:

1. A resource acquisition system comprising:
    a communications network;
    a plurality of distributed computing resources located in a plurality of administrative domains of said network;
    a plurality of resource managers respectively located in said administrative domains and connected to said network, each resource manager performing management of the computing resources located in its administrative domain; and
    a scheduler connected to said network receiving a resource acquisition request from a client terminal via said network, generating a workflow including dependence information between reconfiguration operations executed on a plurality of computing resources, determining at least one administrative domain which includes said plurality of computing resources determined based on said workflow and transmitting to said determined at least one administrative domain via said network a verification request specifying said plurality of computing resources and said reconfiguration operations,
    at least one of said resource managers being responsive to receiving said verification request, assigning scores to one or more candidate computing resources, selecting one or more of said specified computing resources from said candidate computing resources according to said scores, verifying that said selected one or more computing resources is reconfigurable, creating a resource status table comprising a plurality of entries each containing a current state, a new state, and an identifier for each verified computing resource, performing an ownership check on each verified computing resource based on said identifier to determine if said specified reconfiguration operations can be performed, updating said current state with said new state for each verified computing resource transmitting verification report information indicating to said scheduler which verified computing resource is reconfigurable, and storing verification order information indicating the order of said verification in a reconfiguration data memory,
    said scheduler being responsive to receiving said verification report information to transmit a reconfiguration request to said at least one resource manager to perform said reconfiguration on each verified computing resource based on said verification order information.

2. The resource acquisition system of claim 1, wherein said scheduler and said at least one resource manager repeatedly exchange said verification request and said verification report information for reconfiguration of each of the plurality of computing resources.

3. The resource acquisition system of claim 1, wherein said at least one resource manager performs an ownership check on the reconfigured computing resource to verify that the resource is accessible.

4. The resource acquisition system of claim 1, wherein said at least one resource manager performs a rollback operation if reconfiguration is not successfully performed on the verified resource.

5. The resource acquisition system of claim 1, wherein said at least one resource manager transmits a failure report to said scheduler if said reconfiguration fails,
    wherein said scheduler is responsive to said failure report for transmitting a cancellation request to said at least one resource manager for canceling a previously transmitted verification report.

6. The resource acquisition system of claim 5, wherein said scheduler generates a workflow in response to a resource acquisition request for describing multiple groups of resource operation pairs, said groups being associated with each other in hierarchically dependent relationships, and updates said workflow when reconfiguration is performed on each of the specified resources on a group-by-group basis.

7. A resource acquisition method on a system including computing resources distributed at plural locations on a network, the method comprising the steps of:
    a) at a computing resource at a first location, generating a workflow including dependence information between reconfiguration operations executed on a plurality of computing resources, determining at least one administrative domain which includes said plurality of computing resources determined based on said workflow and transmitting to said determined at least one administrative domain via said network a verification request specifying said plurality of computing resources and said reconfiguration operations;
    b) at a computing resource at a second location, receiving said verification request;
    c) at said computing resource at said second location, in response to receiving said verification request, assigning scores to one or more candidate computing resources, selecting one or more of said specified computing resources from said candidate computing resources according to said scores, verifying that said each selected computing resource is reconfigurable if it can be accessible;
    d) at said computing resource at said second location, creating a resource status table for mapping a current state and a new state for each verified computing resource when said specified reconfiguration operations are performed on each verified computing resource, performing an ownership check on each verified computing resource based on identifiers contained in said resource status table to determine if said specified reconfiguration operations can be performed, formulating verification report information indicating which verified computing resource is reconfigurable, storing verification order information indicating the order of said verification in a reconfiguration data memory and transmitting said verification report information to said computing resource at said first location;

e) at said computing resource at said first location, receiving said verification report and transmitting a reconfiguration request to said computing resource at said second location; and f) at said computing resource at said second location, receiving said reconfiguration request for reconfiguring each verified computing resource according to each new state, updating each current state with the corresponding new state and performing reconfiguration for each verified computing resource based on said verification order information.

8. The method of claim 7, wherein said plurality of computing resources and said plurality of operations are divided into a plurality of successive reconfiguration groups of resource operation pairs, said successive groups of both computing resources and operations being associated in a hierarchically dependent relationship with each other, wherein step (a) comprises the steps of formulating, at said computing resource at said first location, each one of a plurality of said verification requests corresponding to each of said successive groups of computing resources and transmitting each of said verification requests to said computing resource at said second location, wherein step (b) comprises the steps of receiving each of the verification requests and performing the specified operations on the specified computing resources, wherein step (c) comprises the step of verifying that said computing resources specified in each of the received requests are reconfigurable if said operations were performed, and wherein step (d) comprises the step of formulating said verification report information for each of said verification requests if the specified operations were successfully performed on said computing resources.

9. The method of claim 7, wherein step (c) comprises the step of performing said ownership check by using an access control list.

10. The method of claim 7, wherein step (f) comprises the step of performing a rollback operation on a verified computing resource if at least one of the specified operations cannot successfully be performed.

11. The method of claim 7, further comprising the steps of:
transmitting a failure report from said computing resource at said second location to said computing resource at said first location if at least one of said operations was not successfully performed;
receiving, at said computing resource at said first location, said failure report and transmitting a cancellation request to said computing resource at said second location; and
receiving, at said computing resource at said second location, said cancellation request and canceling a verification request maintained in a memory as corresponding to the received cancellation request.

12. A computer-readable storage medium containing a program for performing reconfiguration on distributed computing resources, said program comprising the steps of:

a) at a first location, generating a workflow including dependence information between reconfiguration operations executed on a plurality of computing resources and determining at least one administrative domain which includes said plurality of computing resources determined based on said workflow and transmitting to said determined at least one administrative domain a verification request specifying said plurality of computing resources and said reconfiguration operations;

b) at a second location, receiving said verification request;

c) at said second location, in response to receiving said verification request, assigning scores to one or more candidate computing resources, selecting said one or more specified computing resources from said candidate computing resources according to said scores, verifying that each selected computing resource is reconfigurable if it can be accessible;

d) at said second location, creating a resource status table for mapping a current state and a new state for each verified computing resource when said specified reconfiguration operations are performed on each verified computing resource, performing an ownership check on each verified computing resource based on identifiers contained in said resource status table to determine if said specified reconfiguration operations can be performed, formulating verification report information indicating that each verified computing resource is reconfigurable to a requester of said verification request, storing verification order information indicating the order of said verification in a reconfiguration data memory and transmitting said verification report information to said first location;

e) at said first location, receiving said verification report and transmitting a reconfiguration request to said second location; and f) at said second location, receiving said reconfiguration request for reconfiguring each verified computing resource according to each new state in said resource status table, updating each current state with the corresponding new state for each verified computing resource and performing reconfiguration for each verified computing resource based on said verification order information.

* * * * *